(12) United States Patent
Bruck

(10) Patent No.: US 12,554,081 B2
(45) Date of Patent: Feb. 17, 2026

(54) OPTIC MULTIPLEXER OR DEMULTIPLEXER

(71) Applicant: Cisco Technology, Inc., San Jose, CA (US)

(72) Inventor: Roman Bruck, Vienna (AT)

(73) Assignee: Cisco Technology, Inc., San Jose, CA (US)

( * ) Notice: Subject to any disclaimer, the term of this patent is extended or adjusted under 35 U.S.C. 154(b) by 467 days.

(21) Appl. No.: 18/315,118

(22) Filed: May 10, 2023

(65) Prior Publication Data
US 2024/0094483 A1    Mar. 21, 2024

Related U.S. Application Data

(60) Provisional application No. 63/376,385, filed on Sep. 20, 2022.

(51) Int. Cl.
  *G02B 6/42*     (2006.01)
  *G02B 6/27*     (2006.01)
  *G02B 6/293*    (2006.01)

(52) U.S. Cl.
  CPC ......... *G02B 6/4215* (2013.01); *G02B 6/2706* (2013.01); *G02B 6/29365* (2013.01); *G02B 6/4213* (2013.01); *G02B 6/4214* (2013.01)

(58) Field of Classification Search
  CPC .............. G02B 6/4215; G02B 6/2706; G02B 6/29365; G02B 6/4213; G02B 6/4214; G02B 6/2773; G02B 6/29367
  See application file for complete search history.

(56) References Cited

U.S. PATENT DOCUMENTS

| | | |
|---|---|---|
| 10,917,190 B2 * | 2/2021 | Sahni .................. H04J 14/0305 |
| 2002/0171931 A1 | 11/2002 | McLoed et al. |
| 2017/0214482 A1 | 7/2017 | Frisken |
| 2018/0284350 A1 | 10/2018 | Ayliffe et al. |
| 2020/0092025 A1 | 3/2020 | Sahni et al. |
| 2022/0291461 A1 | 9/2022 | Elsinger et al. |
| 2023/0081747 A1 | 3/2023 | Sahni et al. |

OTHER PUBLICATIONS

U.S. Appl. No. 18/310,433 for Cisco Matter titled "Wavelength Multiplexing or Demultiplexing Using a Lens Array With an Angled Facet" filed May 1, 2023.

* cited by examiner

*Primary Examiner* — John Bedtelyon
(74) *Attorney, Agent, or Firm* — Patterson + Sheridan, LLP

(57) ABSTRACT

Certain embodiments of the present disclosure are directed towards an optical assembly such as a multiplexers/demultiplexers (MDM). One example optical assembly generally includes: a fiber array configured to provide an optical signal with a plurality of wavelengths; optical wavelength filters configured to separate the plurality of wavelengths into respective optical signals; a lens array configured to receive the respective optical signals from the optical wavelength filters and focus the respective optical signals before reaching an optical interface for a photonic chip; and a birefringent crystal disposed between the lens array and the optical interface.

20 Claims, 21 Drawing Sheets

OPTIC MULTIPLEXER OR DEMULTIPLEXER

CROSS-REFERENCE TO RELATED APPLICATIONS

This application claims benefit of U.S. provisional patent application Ser. No. 63/376,385 filed Sep. 20, 2022. The aforementioned related patent application is herein incorporated by reference in its entirety.

TECHNICAL FIELD

Embodiments presented in this disclosure generally relate to optic multiplexing/demultiplexing. More specifically, embodiments disclosed herein provide an optic multiplexing/demultiplexing device implemented with a birefringent crystal.

BACKGROUND

Optic multiplexing/demultiplexing devices are important components in optical communication systems. Multiplexing/demultiplexing devices are used to combine or separate multiple optical signals of different wavelengths. This process is important to the efficient use of optical fibers in telecommunications, data center interconnects, and other applications that involve high-bandwidth data transmission.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
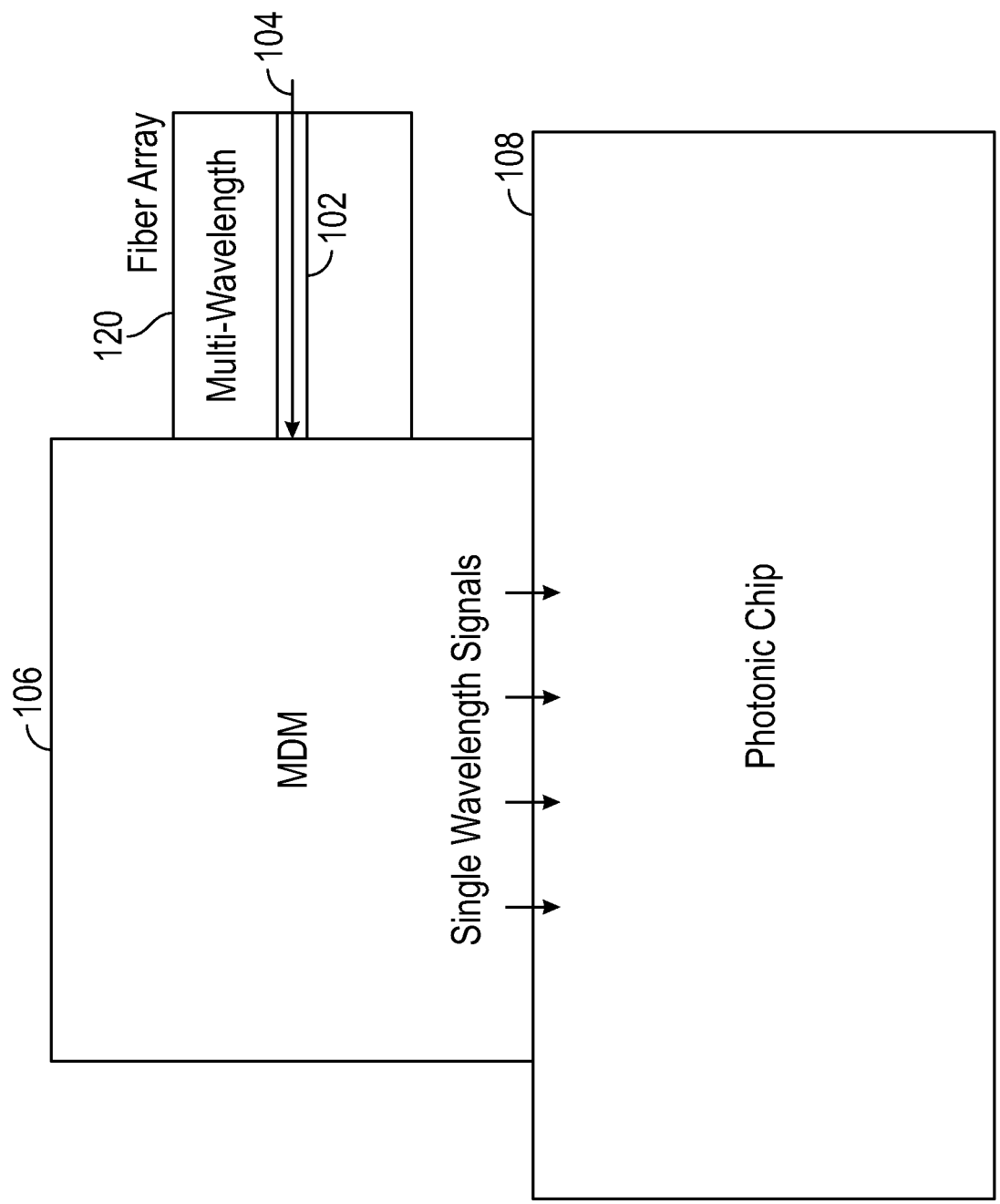
FIG. 1 is a block diagram illustrating an example multiplexer/demultiplexer (MDM) on a photonic chip, in accordance with certain embodiments of the present application.

Certain embodiments of the present disclosure provide an optical assembly. The optical assembly generally includes: a fiber array configured to provide an optical signal with a plurality of wavelengths; optical wavelength filters configured to separate the plurality of wavelengths into respective optical signals; a lens array configured to receive the respective optical signals from the optical wavelength filters and focus the respective optical signals before reaching an optical interface for a photonic chip; and a birefringent crystal disposed between the lens array and the optical interface.

Certain embodiments of the present disclosure provide an optical assembly. The optical assembly generally includes: a lens array having a first portion and a second portion; an optical block; optical wavelength filters disposed between the optical block and the first portion of the lens array; a spacer disposed between the second portion of the lens array and the optical block; and a birefringent crystal disposed between the first portion of the lens array and an optical interface for a photonic chip.

Certain embodiments of the present disclosure provide a method for optical signal processing. The method generally includes: providing, via a fiber array, an optical signal with a plurality of wavelengths; separating, via optical wavelength filters, the plurality of wavelengths into respective optical signals; focusing, via a lens array, the respective optical signals before reaching an optical interface for a photonic chip; and providing, via the birefringent crystal and for each of the respective optical signals, optical polarization signals of different polarizations at the optical interface for the photonic chip.

Example Embodiments

Current telecommunication standards increasingly rely on wavelength division multiplexing to cope with increasing data rates. In some cases, micro-optic multiplexers/demultiplexers (MDMs) implemented externally to a silicon photonic chip may couple wide wavelength windows into silicon photonic chips. Because of high integration density in silicon photonic chips and area on silicon wafers being expensive, it is important to implement MDMs of small form factor that keep precise alignment of transmitted beams. However, complex optical assemblies having small components, typically held together by epoxy bond lines of small area, are generally susceptible to be brought out of alignment by outside forces, shocks, and vibrations. This is especially true in harsh environments for telecommunication products, such as high temperature and/or high humidity.

In some aspects of the present disclosure, a birefringent crystal may be implemented between a lens array and an interface for coupling to a photonic chip. The birefringent crystal may receive an optical signal having an arbitrary polarization and provides optical signals having different polarizations. As described in more detail herein, the positioning of the birefringent crystal results in the crystal receiving a focused optical signal, allowing for smaller polarization beam offsets. The smaller polarization beam offsets facilitate a smaller foot print for the MDM and cost reductions.

FIG. 1 is a block diagram illustrating an example MDM 106 on a photonic chip 108. As shown, a fiber array 120 may be coupled to the MDM 106. An optical signal 104 may be provided to the MDM 106 via an optical fiber 102 of the fiber array 120. The optical signal 104 may be a multi-wavelength optical signal. The MDM 106 may split the optical signal to provide multiple optical signals, each having one of the multiple wavelengths of optical signal 104, as shown. To facilitate understanding, the operation of example MDMs may be described herein with respect to separating a multi-wavelength optical signal. However, the MDMs described herein may be used to combine signals in a similar manner. Certain embodiments of the present disclosure provide a MDM (e.g., a four-channel MDM) to interface light from optical fibers with an integrated optic chip, e.g. fabricated using a silicon photonics platform. The MDM may be attached to a photonic chip. In one embodiment, the MDM interfaces single-channel, single-polarization light with the photonics chip, and four-channel, arbitrary polarization light with the fibers.

Figure 2:
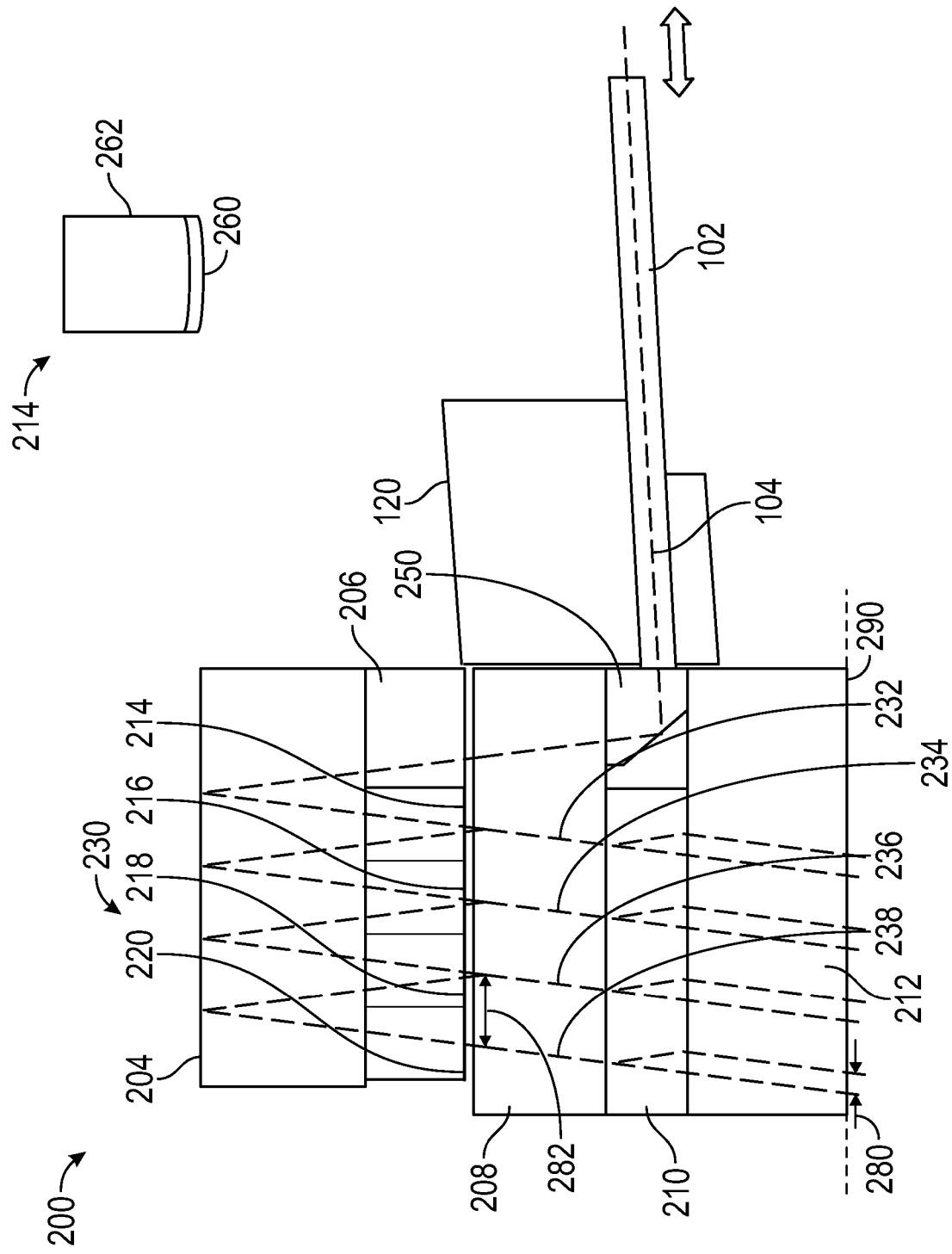
FIG. 2 illustrates an example MDM having a polarization splitting/combining element, in accordance with certain embodiments of the present disclosure.

FIG. 2 illustrates an example MDM 200 (e.g., corresponding to MDM 106 of FIG. 1) having a polarization splitting/combining element (e.g., a birefringent crystal 210), in accordance with certain embodiments of the present disclosure. The birefringent crystal 210 may be disposed below a lens array 208. The lens array 208 may be a semiconductor (e.g., silicon) lens array. Light incident onto the photonic chip may travel with a slight tilt (e.g., 8°) (e.g., with respect to a vertical axis) for good coupling from the MDM to the photonic chip. On the other hand, the fiber interface (e.g., for optical fiber 102) may have a near-horizontal orientation to facilitate a fit of the MDM in a transceiver module housing which may have a height constraint. Thus, the MDM 200 changes the propagation direction of the received optical signal 104.

In some embodiments of the present disclosure, the optical signal 104 from the fiber array 120 may be provided to a prism 250. The prism 250 may be disposed adjacent to the birefringent crystal 210 and between the lens array 208 and a spacer 212, as shown. The prism 250 changes the propagation direction of the optical signal 104, as shown. For example, the propagation direction of the optical signal 104 may be changed so that the optical signal 104 is provided to an optical block 204.

In some embodiments, a spacer 206 (e.g., glass spacer) may be disposed between the lens array 208 and the optical block 204 such that the optical signal 104 is provided from the lens array 208 to the optical block 204 through the spacer 206, as shown. In some embodiments, multiple filters (e.g., filters 214, 216, 218, 220) may be disposed between the lens array 208 and the optical block 204, each of the filters being associated with a wavelength of the multiple wavelengths of the optical signal 104. For example, the optical signal 104 may be reflected from a surface 230 of the optical block towards filter 214. The lens array 208 may include a respective lens corresponding to each of the filters 214, 216, 218, 220.

The filter 214 may provide an optical signal 232 having a first wavelength (e.g., corresponding to a first one of the wavelengths of the optical signal 104) to the photonic chip, such as the photonic chip 108 described with respect to FIG. 1. For example, the filter 214 may allow a first optical wavelength (e.g., associated with optical signal 232) of optical signal 104 to propagate to the photonic chip and reflect the optical signal 104 back to the optical block 204. The optical signal 232 may propagate to the photonic chip through the lens array 208 which may focus (e.g., via a lens corresponding to filter 214) the optical signal 232 before reaching an optical interface 290 for the photonic chip.

A birefringent crystal allows for polarization splitting or combining of optical signals. In some embodiments, the birefringent crystal 210 and spacer 212 (e.g., a glass spacer) may be coupled between the lens array 208 and the photonic chip. The optical signal 232 may be provided to the photonic chip through the birefringent crystal 210 and the spacer 212, as shown. The optical signal 232 provided to the birefringent crystal 210 may have an arbitrary polarization. The birefringent crystal 210 may split the polarization of the optical signal 232 and generate optical signals having different polarizations (e.g., having polarizations that are offset by 90°). For instance, depending on the characteristics of the birefringent crystal 210, each of the optical signals 232, 234, 236, 238 may be split into two signals having different polarizations such as one signal having a −45° polarization and another signal having a +45° polarization.

Filter 214 may reflect at least a portion of the optical signal 104 back towards surface 230 to be reflected from surface 230 towards filter 216. Similar to filter 214, filter 216 may provide an optical signal 234 having a second wavelength (e.g., corresponding to a second one of the wavelengths of the optical signal 104) to the photonic chip. As shown, the optical signal 234 may be provided to the photonic chip through the birefringent crystal 210 and the spacer 212.

Similarly, filter 216 may reflect at least a portion of the optical signal 104 back towards surface 230 to be reflected from surface 230 to filter 218, providing an optical signal 236 (e.g., having a third one of the wavelengths of the optical signal 104) to the photonic chip through the birefringent crystal 210 and the spacer 212. Filter 218 may reflect at least a portion of the optical signal 104 back towards surface 230 to be reflected from surface 230 to filter 220, providing an optical signal 238 (e.g., having a fourth one of the wavelengths of the optical signal 104) to the photonic chip through the birefringent crystal 210 and the spacer 212.

As shown, the birefringent crystal 210 provides, for each of the respective the optical signals 232, 234, 236, 238, optical signals (e.g., also referred to herein as optical polarization signals) of different polarizations at the optical interface 290. An offset (e.g., offset 280) between the optical polarization signals of different polarizations at the optical interface 290 is smaller than the spacing (e.g., spacing 282) of lenses in the lens array.

While four filters are described, any suitable number of filters (e.g., one or more filters) may be used. For example, a single filter may generate a single optical signal with one of the wavelengths of the multi-wavelength optical signal 104, or two filters may be used to generate two optical signals with wavelengths corresponding to respective wavelengths of optical signal 104.

The MDM 200 uses a single, fully utilized lens array. In one embodiment, the MDM 200 uses a single lens array with five rows of lenses (e.g., four lens rows for each of four filters 214, 216, 218, 220, and another lens row from propagating the optical signal 104 from the prism 250 to the optical block 204). Silicon micro-lens arrays are one of the price drivers for MDMs. Since the cost of silicon devices scales with their area, using a minimum number of lenses (e.g., five lens rows for some applications) provides a cost advantage and reduces part count.

The MDM 200 provides a beam interface with a sub-lens diameter polarization offset. Typically, polarization beam splitters (PBSs) may be implemented in a collimated region of the MDM. For example, polarization splitting may occur prior to the beam being focused via lens array 208. The PBS being implemented in the collimated region may result in offsets between the optical signals of different polarizations. The offset may be equal to the lens spacing (e.g., 500 μm). In some aspects, a focal polarization displacer (FPD) (e.g., birefringent crystal 210) is disposed between the lens array 208 and the photonic chip. Thus, the optical signal 104 may be focused when reaching the birefringent crystal 210, allowing for the usage of smaller polarization beam offsets (e.g., 35 μm). The FPD also allows for a reduction of the number of lenses used in the array, as no additional lenses may be used to support polarization multiplexing.

In some aspects, a silicon bottom spacer 212 may be used (e.g., as opposed to a glass spacer). Using high-refractive index silicon instead of glass lengthens the focal distance for the lenses of the lens array 208, allowing for increased ground clearance of components protruding from the MDM 200, such as the fiber array 120. In other words, by using a silicon spacer (as opposed to a glass spacer), the length of the spacer may be increased, increasing the height of the fiber array 120 from the optical chip on which the MDM 200 is disposed. Increasing the ground clearance simplifies the integration of the MDM 200 in complex data communication products where the environment is densely packed with electronic components.

In some embodiments, the MDM 200 provides a symmetric sandwich structure for the birefringent crystal 210. The thermal expansion coefficients of birefringent crystals are higher than many other materials. By placing the birefringent crystal 210 in a symmetric sandwich structure with elements of the same material on both sides (e.g., between lens array 208 and spacer 212), temperature-dependent warpage of the layer stack may be reduced, which reduces mechanical stress in the bond lines and increases reliability and optical performance. In other words, the birefringent crystal 210 being sandwiched between lens array 208 and spacer 212 having the same temperature dependent warpage characteristics (e.g., made of same material or materials having the same mechanical layer strength), reduces warpage associated with the birefringent crystal 210 due to temperature changes.

The MDM 200 also provides warped filter coatings. Optical filter coatings are deposited at high temperatures. Mechanical stress may be induced in the glass that carries the coatings. As a result, the surface of the filters can become warped. Like a parabolic mirror, the filter curvature helps to keep the beam collimated during its passage through the MDM 200, reducing the optical loss penalty from the different path lengths of the four wavelength channels. For example, to implement each of the filters 214, 216, 218, 220, filter coatings (e.g., optical layers) may be deposited on glass at high temperatures. For instance, as shown in FIG. 2, filter 214 may include coating 260 on glass 262. Due to the high temperature, the glass (and filters) may be warped as the glass cools. In some aspects of the present disclosure, the filter coating may be facing downwards (e.g., the coating of filter 214 faces downwards towards the photonic chip). Thus, the warping of the glass results in a crescent-shaped curve for the coating as shown (e.g., with an opening of the crescent facing upwards). Thus, for reflected optical signals, the crescent-shaped coatings facilitate the collimation of light, as described.

Figure 3A:
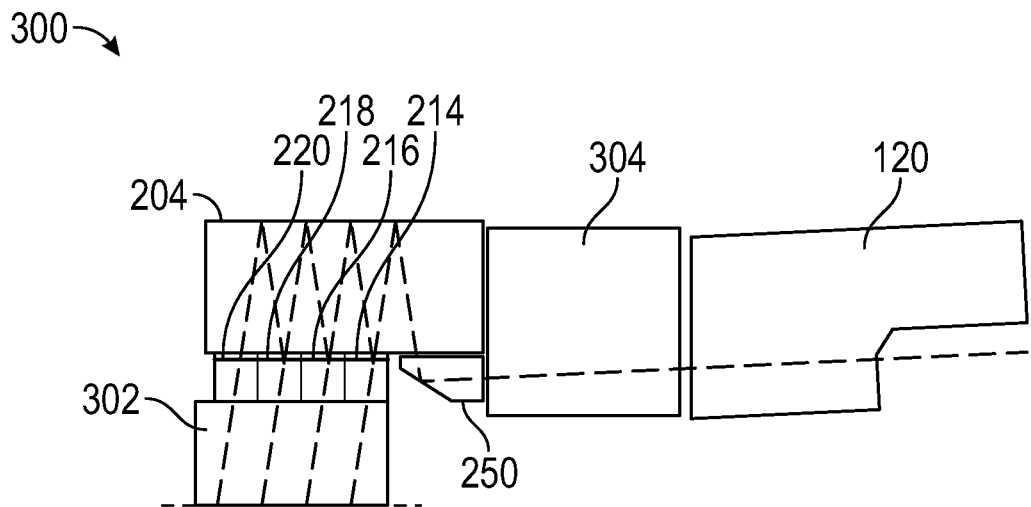
FIG. 3A illustrates an example MDM implemented with silicon lens arrays, in accordance with certain embodiments of the present disclosure.
Figure 3B:
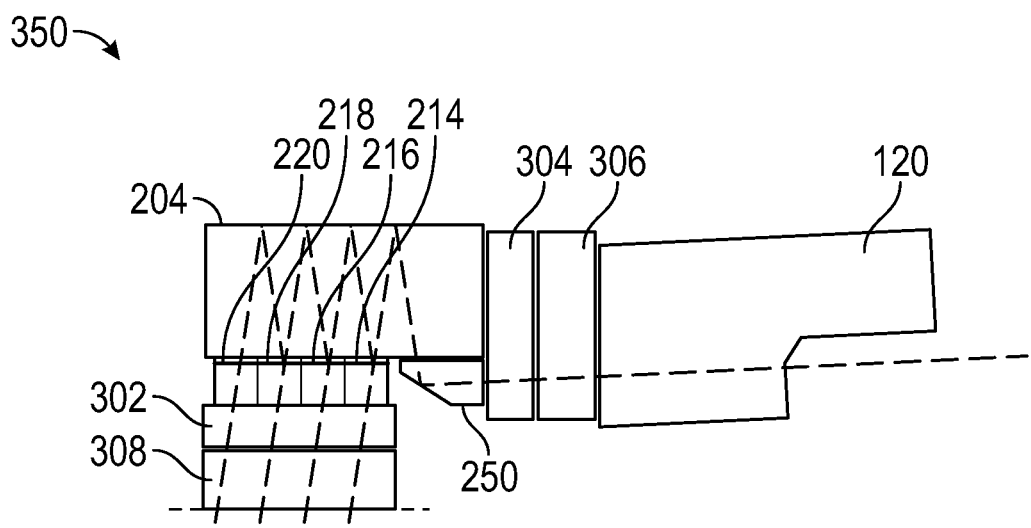
FIG. 3B illustrates an example MDM implemented with silicon lens arrays and glass spacers, in accordance with certain embodiments of the present disclosure.

FIG. 3A illustrates MDM 300 implemented with silicon lens arrays, in accordance with certain aspects of the present disclosure. As shown in FIG. 3A, the MDM 300 may be implemented with a silicon lens array 302 and a silicon lens array 304 between the fiber array 120 and the optical block 204. FIG. 3B illustrates MDM 350 implemented with silicon lens arrays and glass spacers, in accordance with certain aspects of the present disclosure. MDM 350 may be implemented with a glass spacer adjacent to each lens array. For example, MDM 350 may include a spacer 306 between lens array 304 and the fiber array 120 and a spacer 308 between the lens array 302 and the interface to the photonic chip.

The focal length of the lenses in the arrays may be defined by the optical system the MDM employs. Micro-optical lenses are typically produced from silicon (e.g., as shown in FIG. 3A), where the high refractive index of silicon enables lenses of large optical power. The high refractive index of silicon translates the optical focal length into a large physical distance. By replacing part of the lens array silicon with a glass spacer as described, the thickness of the lens array (e.g., lens array 302) can be reduced. This reduces the height of the MDM.

Certain aspects provide an optical assembly comprising a fiber array 120, one or more lens arrays 302, 304, and optical wavelength filters (e.g., filters 214, 216, 218, 220), where the glass spacer is disposed adjacent to (e.g., below) the lens array as described. The lens array 302 may correspond to the lens array 208 of FIG. 2 and the spacer 308 may correspond to the spacer 212 of FIG. 2. A birefringent crystal (e.g., birefringent crystal 210 of FIG. 2) may be disposed between the lens array 302 and the spacer 308, in some aspects. As shown, the coatings of filters 214, 216, 218, 220 may be facing upwards, as shown in FIGS. 3A and 3B.

Figure 4A:
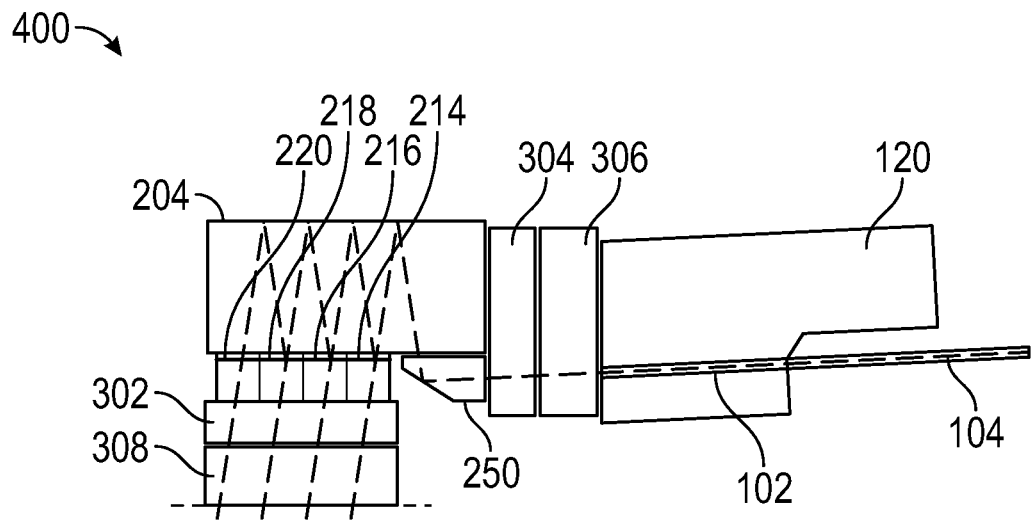
FIG. 4A illustrates an example MDM having an optical fiber extending to a glass spacer, in accordance with certain embodiments of the present disclosure.
Figure 4B:
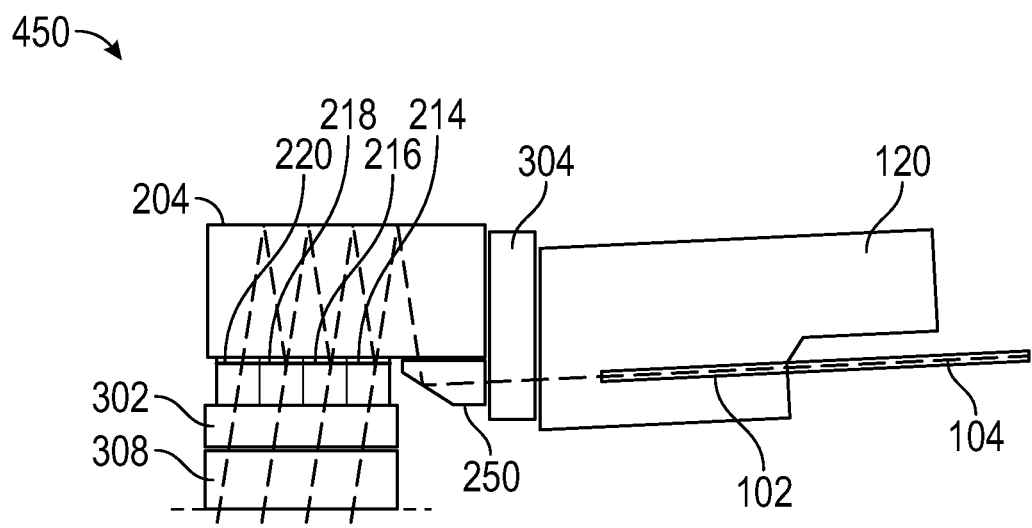
FIG. 4B illustrates an example MDM having a recessed optical fiber, in accordance with certain aspects of the present disclosure.

FIG. 4A illustrates an MDM 400 having an optical fiber 102 extending to a glass spacer 306. FIG. 4B illustrates an MDM 450 having a recessed optical fiber 102, in accordance with certain aspects of the present disclosure. To reduce the part count in the MDM, the glass spacer 306 may be removed as shown FIG. 4B. Instead of using the spacer 306, the optical fiber 102 may be recessed within the fiber array 120, as shown in FIG. 4B. The optical fiber 102 would be recessed from the edge of the fiber array to keep the focal length constant (e.g., keep the focal length of the optical signal 104 for MDM 450 same as the MDM 400). Thus, certain aspects provide an optical assembly comprising a fiber array (e.g., fiber array 120), a lens array (e.g., lens array 304), and optical wavelength filters (e.g., filters 214, 216, 218, 220). The optical fibers in the fiber array may be recessed from an interface between the fiber array and the lens array.

Figure 5A:
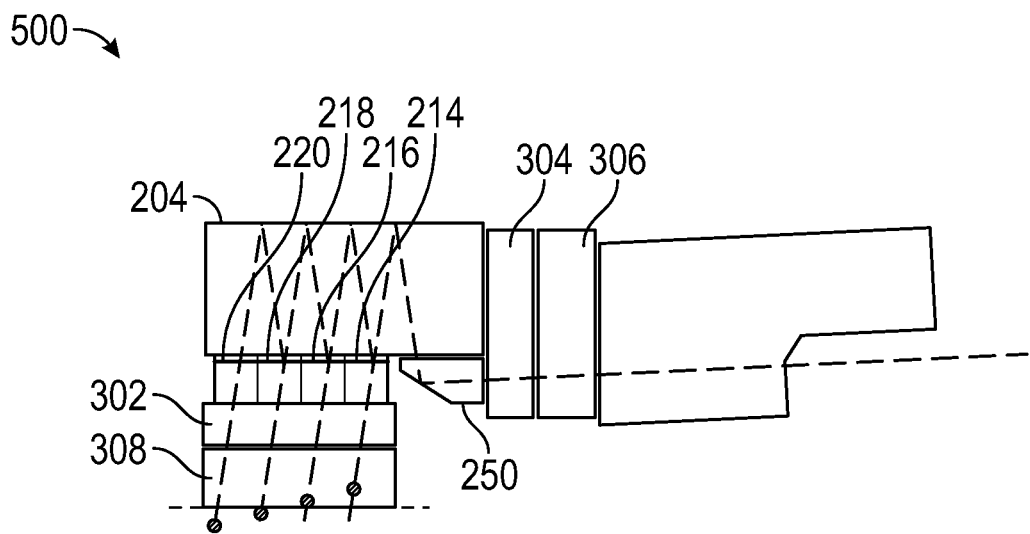
FIG. 5A illustrates focal spots for an example MDM, in accordance with certain aspects of the present disclosure.
Figure 5B:
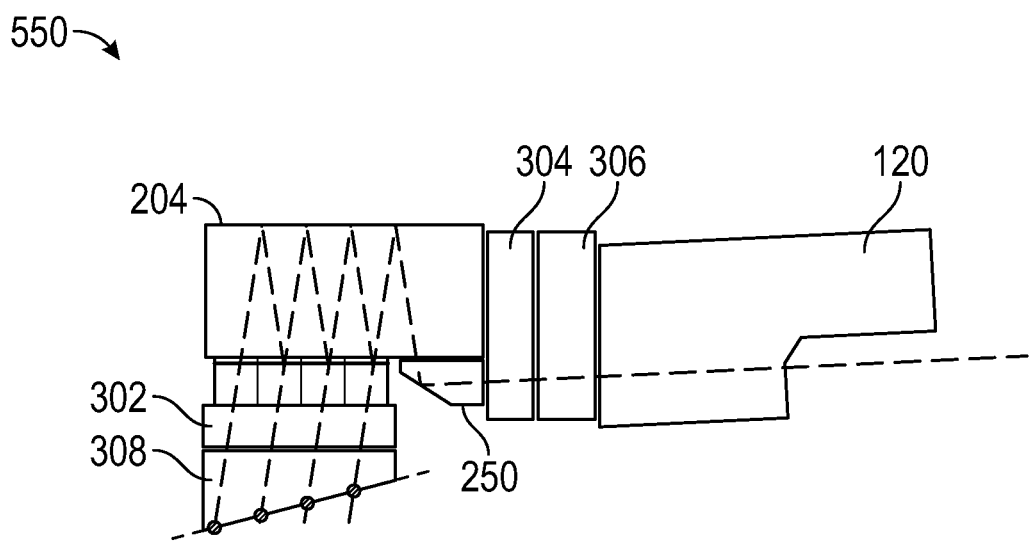
FIG. 5B illustrates an example MDM with a wedge-shaped spacer, in accordance with certain aspects of the present disclosure.

FIG. 5A illustrates focal spots for an MDM 500. FIG. 5B illustrates an MDM 550 with a wedge-shaped spacer 308, in accordance with certain aspects of the present disclosure. Due to the different beam path lengths, the focal spots of the multiple beam paths at the optical interface to the photonic chip vary in height, as shown in FIG. 5A. This causes increased optical loss as the beams are not perfectly focused on the interface. By employing a glass spacer 308 having a wedge-like cross-section, the focal points can be placed at the optical interface as shown in FIG. 5B, reducing optical loss. Certain aspects provide an optical assembly comprising a fiber array (e.g., fiber array 120), a lens array (e.g., lens array 302), and optical wavelength filters (e.g., filters 214, 216, 218, 220), where an optical spacer (e.g., optical spacer 308) is disposed below the lens array and has a varying thickness (e.g., linearly varying thickness).

Figure 6:
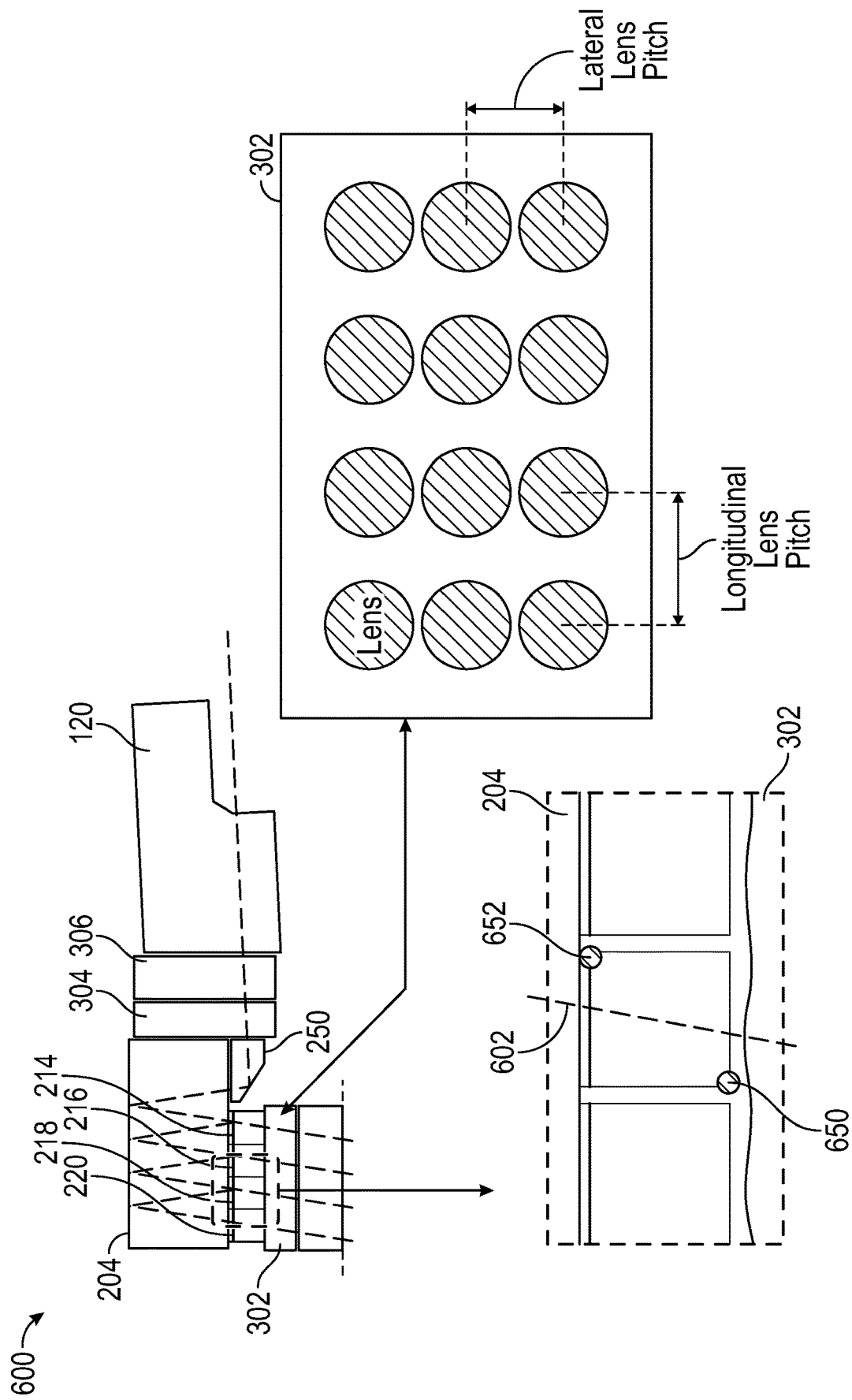
FIG. 6 illustrates an example MDM having a lens array employing different lateral and longitudinal lens pitches, in accordance with certain aspects of the present disclosure.

FIG. 6 illustrates an MDM 600 having a lens array 302 employing different lateral and longitudinal lens pitches, in accordance with certain aspects of the present disclosure. For good performance of the optical coupling from the MDM 600 to the photonic chip and to reduce reflections, the beams incident onto the photonic chip may be tilted (e.g., by 8° to the vertical) as shown for beam 602. When beams traverse through the thickness of the optical filters, the beams accumulate a longitudinal beam offset. The thickness of the filters cannot be reduced beyond a certain limit (e.g., below 500 μm) as the thin film filter coatings induce mechanical stress in the filters, posing stiffness specifications to the supporting filter glass to keep filter warpage to manageable limits. Thus, the longitudinal beam offset in the filters may be set. Moreover, clipping of beams should be avoided to reduce optical losses (e.g., clipping at corners 650, 652 of a filter). Thus, the longitudinal beam pitch, and thus the longitudinal lens pitch, may be larger than the extent of the beams alone. In the lateral direction, such restrictions may not exist, and beams/lenses may be spaced as closely as the beam extent allows. Further, the lateral lens pitch (e.g., of 250 μm) gives greater freedom to adapt to external components such as fiber ribbons that typically come with a set pitch of 250 μm.

To reduce component cost, the lens array area should be reduced, as the price of components such as silicon microlens arrays scales with their area. As a result, in some aspects, lens arrays with different pitches in the longitudinal and lateral directions may be used, as described (e.g., using minimum pitch values in both directions, which are dictated by the specifications of the optical imaging system that constitutes the MDM). Thus, some aspects provide an optical assembly comprising a fiber array (e.g., fiber array 120), a lens array (e.g., lens array 302), and optical wavelength filters (e.g., filters 214, 216, 218, 220), where the lenses in the lens array have different pitches in two axes of the lens array.

Figure 7:
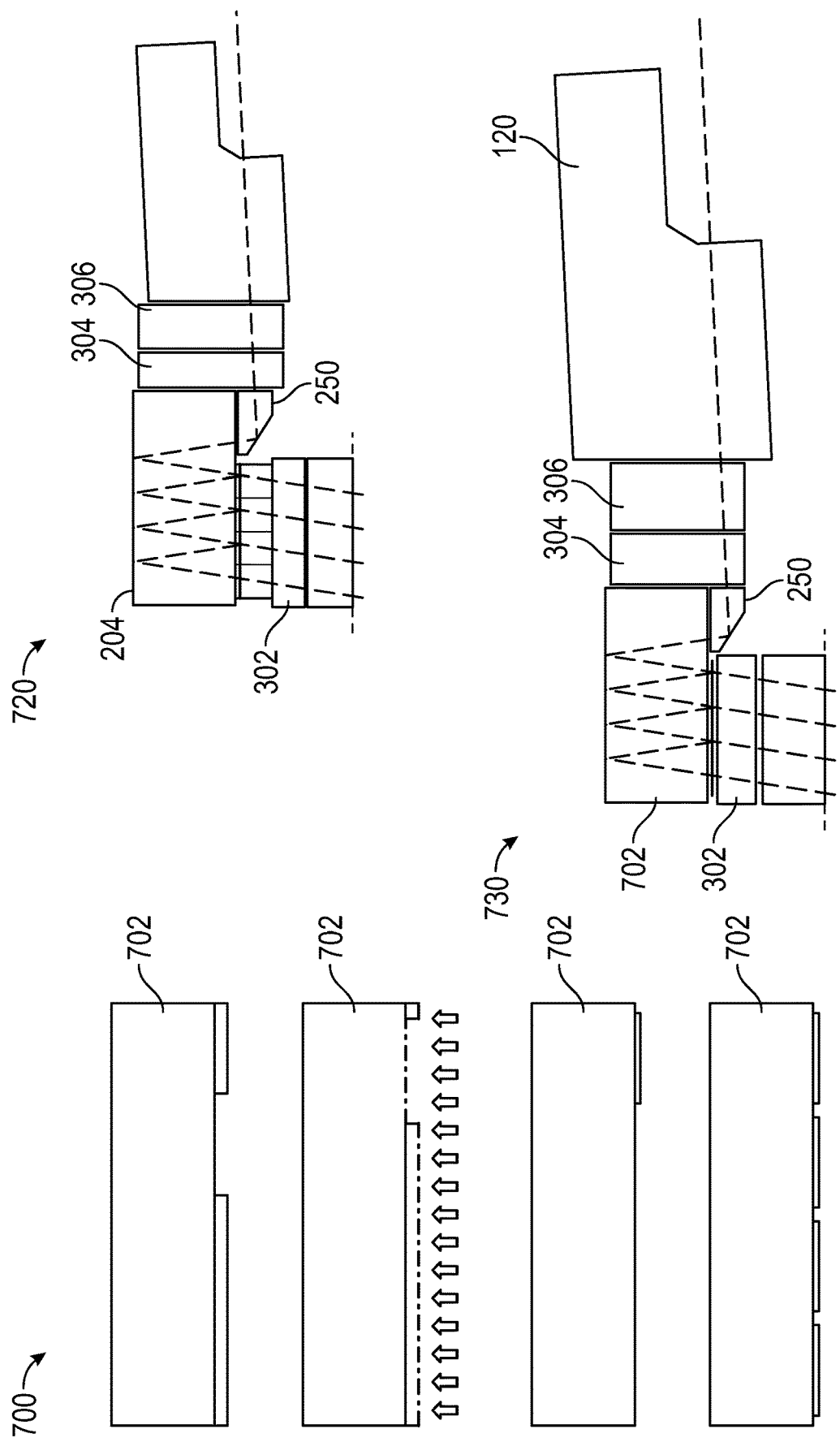
FIG. 7 illustrates an example process for fabricating filters on a common block, in accordance with certain aspects of the present disclosure.

FIG. 7 illustrates an example process 700 for fabricating filters on a common block, in accordance with certain aspects of the present disclosure. As shown, MDM 720 includes individual filters (e.g., fabricated using separate glass blocks). The MDM 720 employs multiple dedicated filters, where each filter carries one coating for a specific wavelength. MDM 730 includes filters fabricated on a common glass block 702. As shown via process 700, certain aspects are directed towards using masked deposition to deposit multiple different coatings on the single block 702 (e.g., providing unified wavelength-selective functionality via optical block 702), reducing part count and assembly complexity.

Moreover, by the removal of the dedicated filters, the MDM height may be reduced and the longitudinal lens pitch in the bottom lens array may be reduced as the lens pitch is only limited by the beam extent. As shown, to fabricate each filter on the optical block 702, a mask may be deposited on the optical block 702, followed by the deposition of a thin-film optical filter, and removal of the mask. This process facilitates a reduction in the size of the MDM and subcomponents of the MDM, yielding corresponding cost savings.

Certain aspects provide an optical assembly comprising a fiber array (fiber array 120), a lens array (e.g., lens array 302), and an optical spacer (e.g., spacer 308) carrying different optical coatings. Optical signals may be split by the optical spacer based on the wavelengths of the optical signals. Optical signals may be offset and routed to individual lenses in the lens array by the optical spacer.

Figure 8:
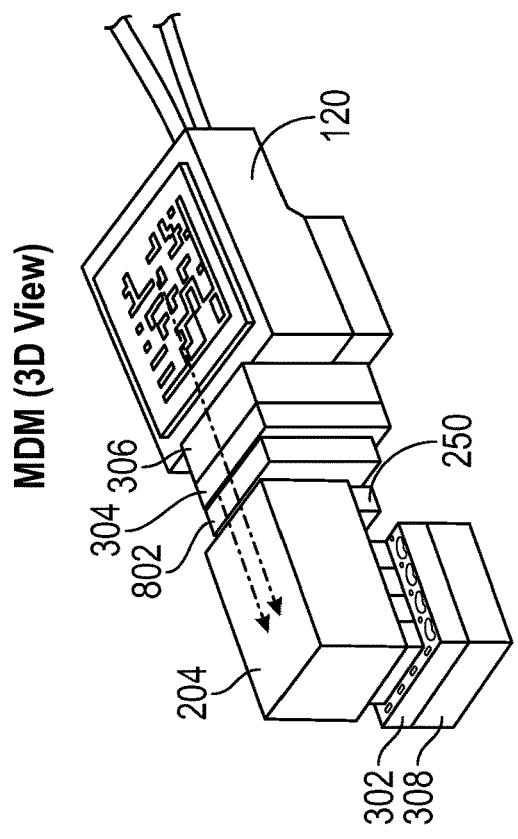
FIG. 8 illustrates example MDM components with high-reflective (HR) coating for immersed applications, in accordance with certain aspects of the present disclosure.
Figure 8:
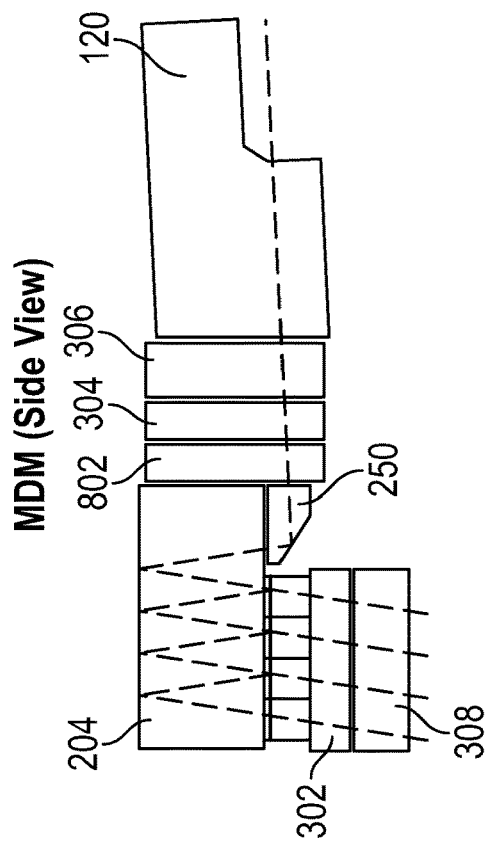
Figure 8:
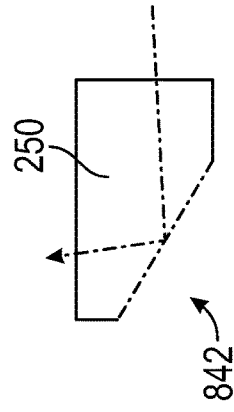
Figure 8:
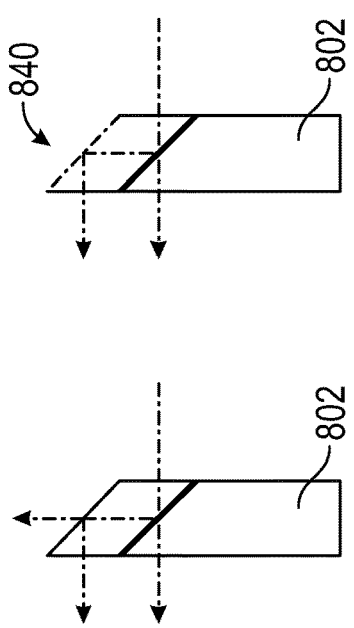

FIG. 8 illustrates MDM components with high-reflective (HR) coating for immersed applications, in accordance with certain aspects of the present disclosure. MDMs may contain components that rely on total internal reflection (TIR) to redirect optical signals in the MDM. One such element could be a polarization beam splitter (PBS), which simplifies the coupling of light to the phonic chip. Gratings used to couple light into the plane of the phonic chip are generally more efficient for a single polarization. PBSs generate a beam offset for one polarization by reflecting this light component twice by 90°, as shown in FIG. 8. The second reflection generally occurs on a slanted outer interface of the PBS.

Another component relying on TIR may be the prism 250 responsible for redirecting optical signals between the close-to-horizontal fiber interface and the close-to-vertical optical interface to the chip. The refractive index of glass is large enough to provide TIR at uncoated interfaces to air. However, in some applications, air may not be the surrounding media. Immersing power-hungry or high-density electronics into a coolant is beneficial for heat dissipation. Once the PBS or prism surface is exposed, for instance, to water (e.g., with a refractive index of 1.33), or an alternative coolant, TIR is no longer provided and light may be lost. Similarly, loss of TIR may also occur when uncoated interfaces are contaminated during manufacturing.

Certain aspects of the present disclosure are directed to coating the outer PBS surface 840 (e.g., of PBS 802) as well as the slanted prism surface 842 (e.g., of prism 250) with an HR coating. This coating may include a metal or thin film layer stack of dielectric materials. Reflection is then provided in all environments and tolerance to surface contaminations is improved.

Certain aspects provide an optical assembly comprising a fiber array (e.g., fiber array 120), a lens array (e.g., lens array 302), optical filters, and a polarization beam splitter (e.g., PBS 802), where an outer surface of the polarization beam splitter is coated with a high-reflective coating. Some aspects provide an optical assembly comprising a fiber array (e.g., fiber array 120), a lens array (e.g., lens array 302), optical filters, and a prism (e.g., prism 250), where an outer surface of the prism is coated with a high-reflective coating.

Figure 9:
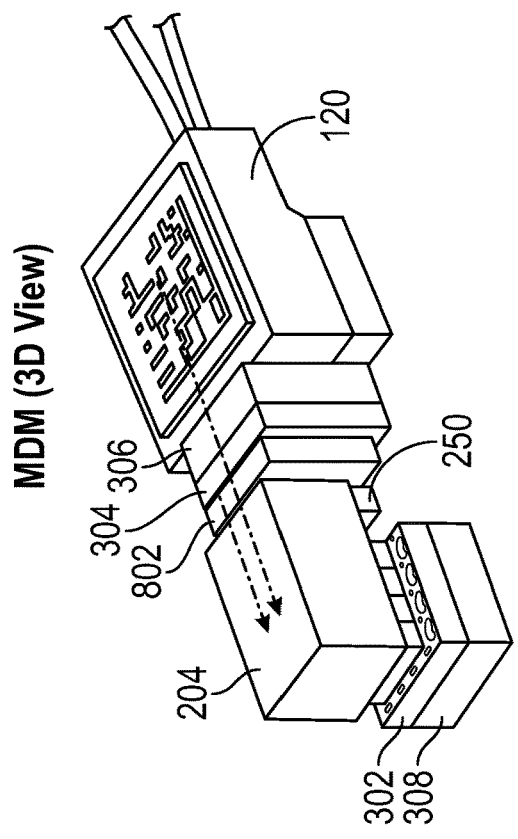
FIG. 9 illustrates a prism with HR coating for polarization control in an example MDM, in accordance with certain aspects of the present disclosure.
Figure 9:
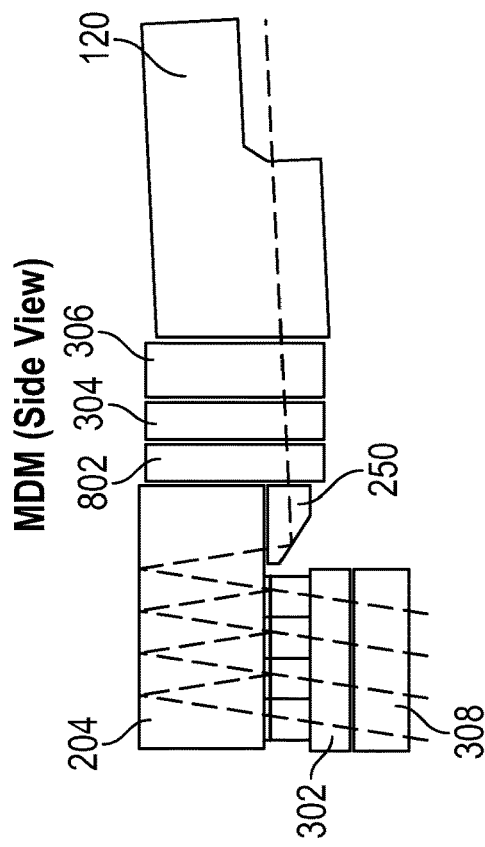
Figure 9:
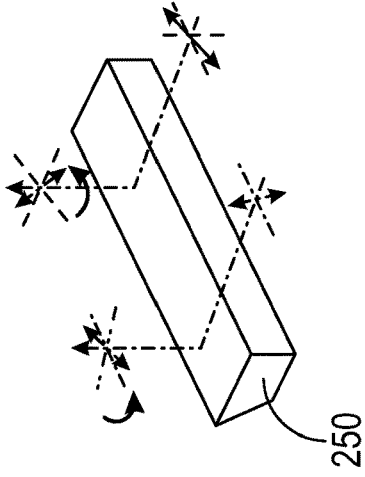
Figure 9:
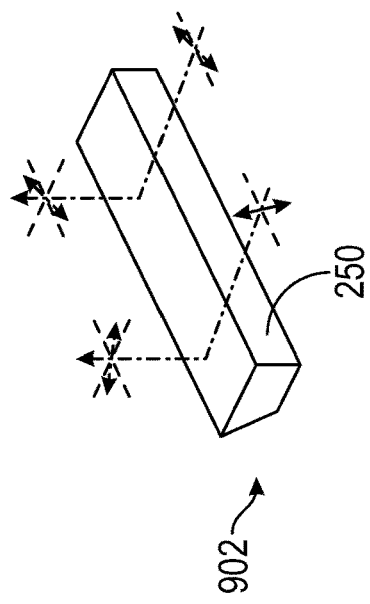

FIG. 9 illustrates a MDM comprising a prism with HR coating, in accordance with certain aspects of the present disclosure. To transition the near-horizontal beams from the fiber array 120 into the near-vertical beams for coupling to the photonic chip, the MDM design contains a prism 250, as described. Generally, the prism 250 relies on TIR to change the beam direction. Unfortunately, when precise maintaining of polarization states is important, using TIR is challenging since TIR introduces a phase delay between the vertical and the horizontal polarization states, resulting in rotation of incoming polarization as shown.

Certain aspects are directed to coating the reflective prism surface 902 with a high-reflective coating, preventing (or at least reducing) such polarization-changing characteristics. Further, the prism 250 becomes more tolerant to contaminations or environmental changes that may negate the TIR.

Figure 10:
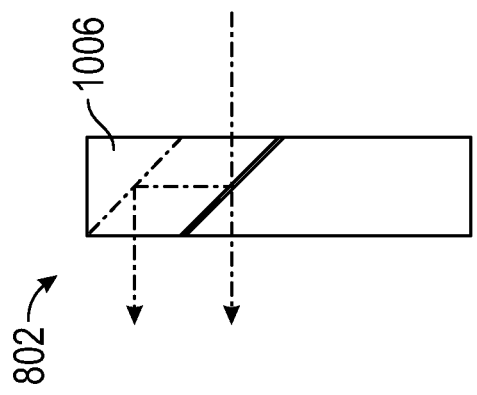
FIG. 10 illustrates an example MDM having a block prism and block PBS, in accordance with certain aspects of the present disclosure.
Figure 10:
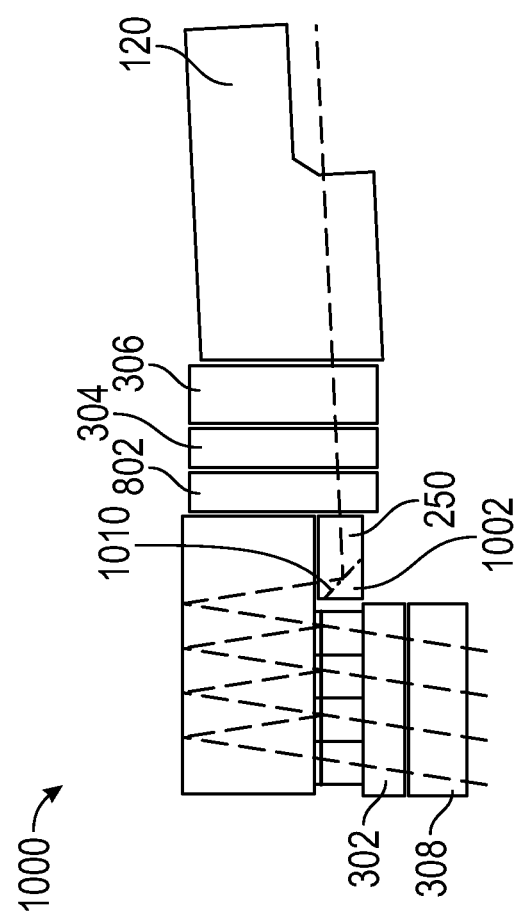

FIG. 10 illustrates an MDM 1000 having a block prism, in accordance with certain aspects of the present disclosure. Optical components made from brittle materials such as glass or silicon are prone to cracking and fracturing. Design features employing acute angles accentuate this problem. For instance, acute angles may be used in the MDM prism (e.g., prism 250 of FIG. 2) to transition the near-horizontal beams from the fiber array into the near-vertical beams for coupling to the photonic die. Another MDM component with an acute angle may be the PBS 802. Certain aspects of the present disclosure provide a block prism (or block PBS). A block prism provides beam reflection with a rectangular cross-section. For instance, a triangular glass piece 1002 may be disposed adjacent to the prism 250 so that the prism is rectangular (e.g., is a block prism). In a block prism, the reflective properties come from an angular dielectric coating 1010 that is shown in the rectangular cross-section of the prism 250 in FIG. 10.

Block prisms allow a mechanically more stable MDM design, and their reflective coating is more protected than that of a prism having an exposed coating. Thus, block prisms improve the reliability of the MDM design. As shown, PBS 802 includes a polarization-splitting coating providing different optical signals having different polarizations. As shown, one of the optical signals may be provided to a prism. A triangular element 1006 may be coupled to the prism to provide a block PBS (e.g., a PBS implemented with a block prism).

Certain aspects provide an optical assembly comprising a fiber array (e.g., fiber array 120), a lens array (e.g., lens array 302), optical filters, and a block prism. Some aspects provide an optical assembly comprising a fiber array (e.g., fiber array 120), a lens array (e.g., lens array 302), optical filters, and a polarization beam splitter (e.g., PBS 802), where the polarization beam splitter comprises a block prism.

Figure 11A:
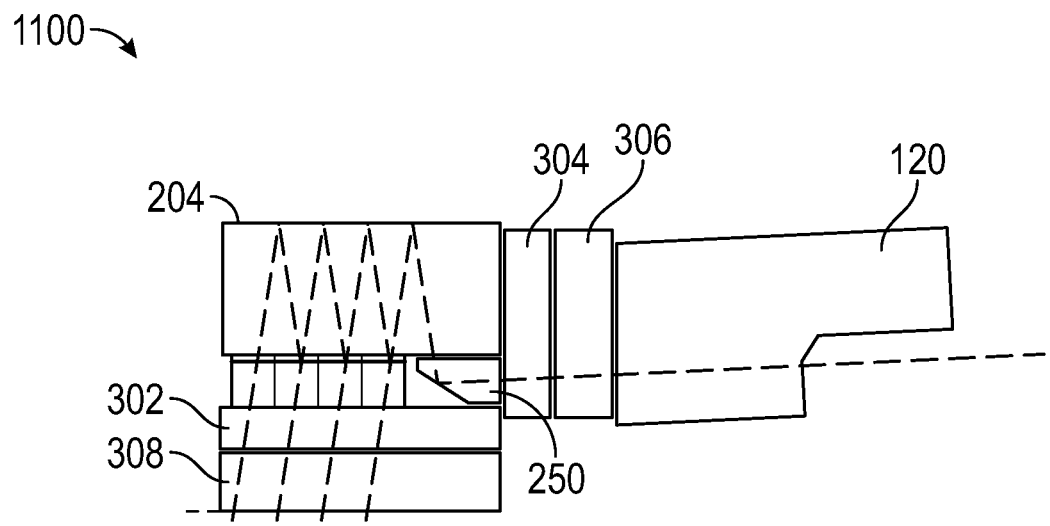
FIGS. 11A and 11B illustrate example MDMs with increased mechanical stability, in accordance with certain aspects of the present disclosure.
Figure 11B:
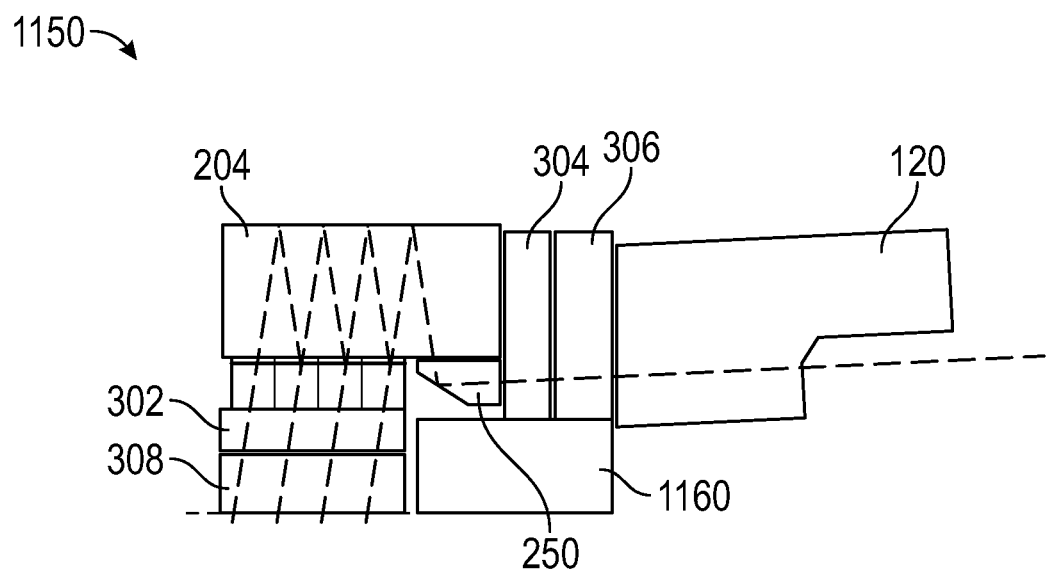

FIGS. 11A and 11B illustrate MDM 1100 and MDM 1150, respectively, with increased mechanical stability, in accordance with certain aspects of the present disclosure. Maintaining precise alignment of the beams in the MDM is important to avoid excess optical losses. Thus, designs of high mechanical stability and stiffness are required. This includes designing toward compact, closed shapes and avoiding a long cantilever arm. As shown in MDM 1100, the lens array 302 and spacer 308 may be extended underneath the prism 250. The prism 250 may be sandwiched between the optical block 204 and the lens array 302 for increased mechanical stability. Additionally, lens arrays 302, 304 may be in contact with each other and may be connected via an epoxy bond line.

In some aspects, as shown for MDM 1150, mechanical support 1160 may be provided below the lens array 304. The mechanical support 1160 may provide no optical functionality but increases the stability and stiffness of the MDM 1150.

Certain aspects provide an optical assembly comprising a fiber array (e.g., fiber array 120), a first lens array (e.g., lens array 302), a second lens array (e.g., lens array 304), optical filters, and a prism (e.g., prism 250), where the prism is in contact with the first lens array and the second lens array. Some aspects provide an optical assembly comprising a fiber array (e.g., fiber array 120), lens arrays (e.g., lens arrays 302, 304), optical filters, and a prism (e.g., prism 250), where the lens arrays are in contact with each other. Some aspects provide an optical assembly comprising a fiber array (e.g., fiber array 120), lens arrays (e.g., lens arrays 302, 304), optical filters, a prism (e.g., prism 250), and mechanical support (e.g., mechanical support 1160). The mechanical support 1160 may connect the lens arrays. For example, the mechanical support 1160 may be below the lens array 304 and adjacent to the lens array 302.

Figure 12:
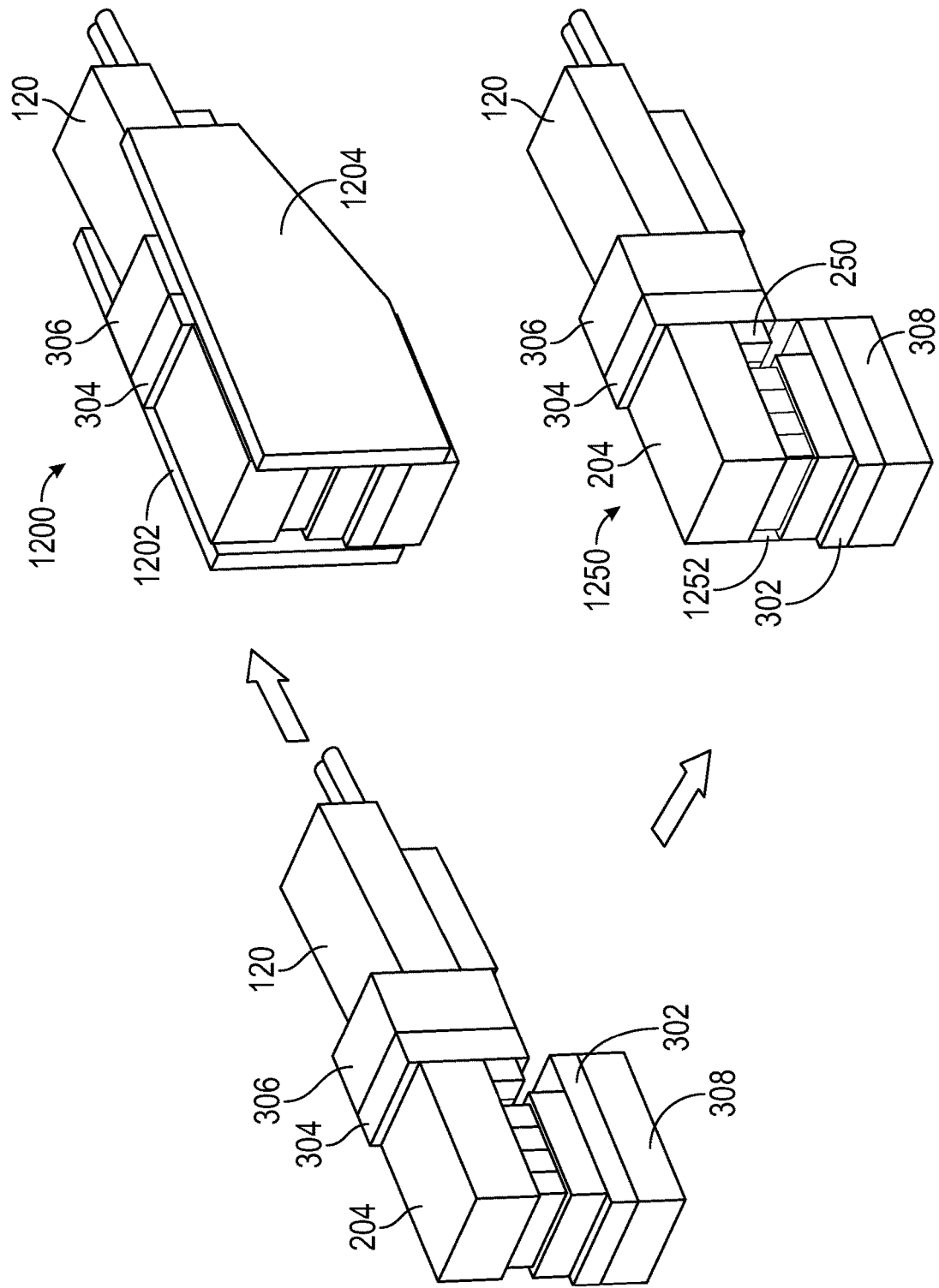
FIG. 12 illustrates MDMs having sidewalls or cavities filled with epoxy for increased mechanical stability and stiffness, in accordance with certain aspects of the present disclosure.

FIG. 12 illustrates MDMs 1200, 1250 having sidewalls 1202, 1204 or cavities filled with epoxy for increased mechanical stability and stiffness, in accordance with certain aspects of the present disclosure. Some aspects provide an optical assembly comprising a fiber array (e.g., fiber array 120), a lens array, optical filters, an optical spacer, and a prism, where at least one sidewall (e.g., sidewall 1204) is disposed adjacent to the prism. MDM 1250 has cavities filled with epoxy 1252. For example, the epoxy 1252 may be disposed adjacent to and below the prism 250, as shown. Some aspects provide an optical assembly comprising a fiber array, a lens array, optical filters, and a prism, where cavities in the optical assembly are filled with epoxy resin.

Figure 13:
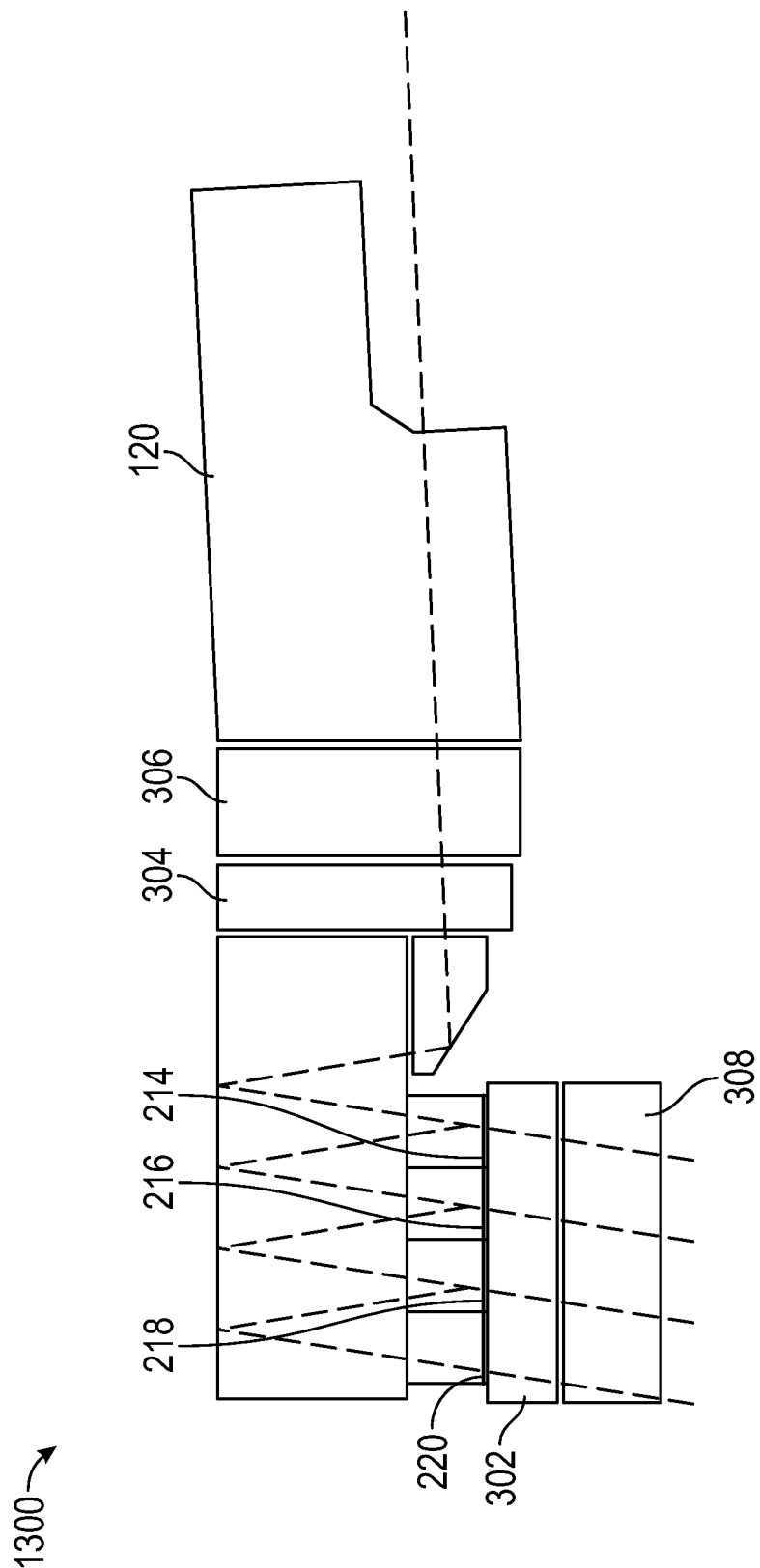
FIG. 13 illustrates an example MDM with inverted filters, in accordance with certain aspects of the present disclosure.

FIG. 13 illustrates an MDM 1300 with inverted filters, in accordance with certain aspects of the present disclosure. Space in the housing of optical transceiver modules is limited and restrictions are placed on the height of components, such as the MDMs, to increase the space for cooling solutions for high-power electronic components. To reduce the height of MDMs, some aspects are directed to inverting the orientations of the filters of the MDM, such that the coatings are placed at the bottom of the filters (e.g., the filter coatings are facing downwards). In such a configuration, the filters themselves become part of the optical block that provides the beam offsets for the outputs of different wavelengths. As a result, the height of the MDM assembly can be reduced without reducing the beam pitch.

Moreover, as described herein, for each of the filters 214, 216, 218, 220, filter coatings (e.g., optical layers) may be deposited on glass at high temperatures. Due to the high temperature, the glass (and filters) may be warped as the glass cools. In some aspects of the present disclosure, the filter coating may be facing downwards (e.g., the coating of filter 214 faces downwards towards the photonic chip). Thus, the warping of the glass results in a crescent-shaped curve for the coating as described and facilitates the collimation of light. Certain aspects provide an optical assembly comprising a fiber array, a lens array (e.g., lens array 302), optical filters (e.g., filters 214, 216, 218, 220), an optical spacer (e.g., spacer 308), and a prism, where filters have wavelength-selective optical coatings that face the lens array. The lens array may be coupled between the optical filters and the optical spacer.

Figure 14:
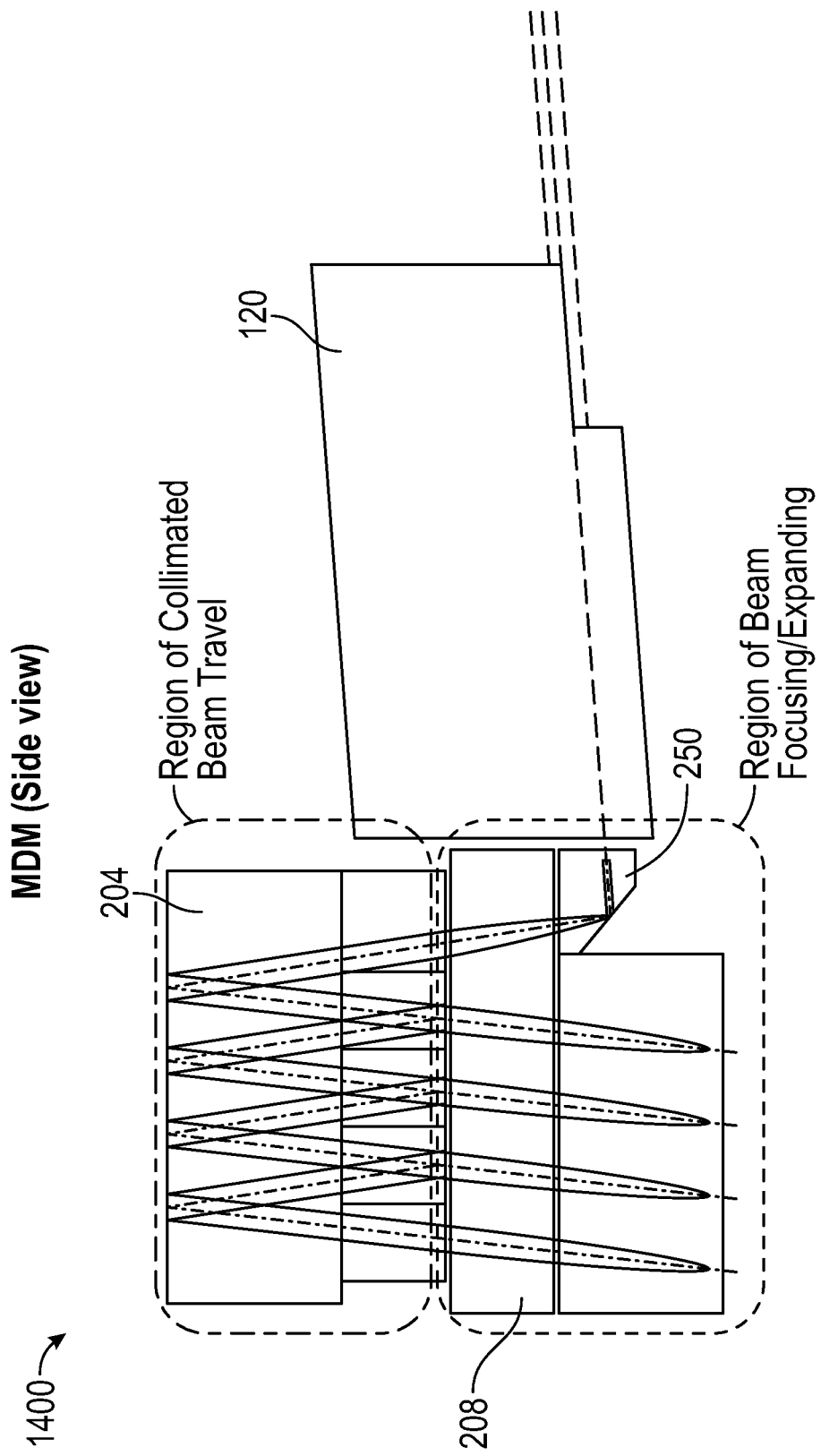
FIG. 14 illustrates an example MDM implemented with a single lens array and a prism in a focusing region of the MDM, in accordance with certain aspects of the present disclosure.

FIG. 14 illustrates an MDM 1400 implemented with a single lens array and a prism in a focusing region of the MDM, in accordance with certain aspects of the present disclosure. Lens arrays are a main driver of the MDM cost. Certain aspects provide an MDM design with a single lens array 208. Some lenses of the array may be used to collimate the optical signals coming from the fiber array (e.g., the optical signal between the prism 250 and the optical block 204). Other lenses of the same array may focus the collimated beams to the interface to the photonic chip.

Certain aspects provide an optical assembly comprising a fiber array (e.g., fiber array 120), a lens array (e.g., lens array 208), optical filters, and a prism (e.g., prism 250), where optical signals are routed between an optical interface of optical fibers and an optical interface connected to an integrated photonic circuit chip. Some aspects provide an optical assembly comprising a fiber array (e.g., fiber array 120), a lens array (e.g., lens array 208), optical filters, and a prism, where optical signals are routed between an optical interface of optical fibers and an optical interface connected to an integrated photonic circuit chip, and the prism is disposed between the lens array and the optical interface of optical fibers.

Figure 15:
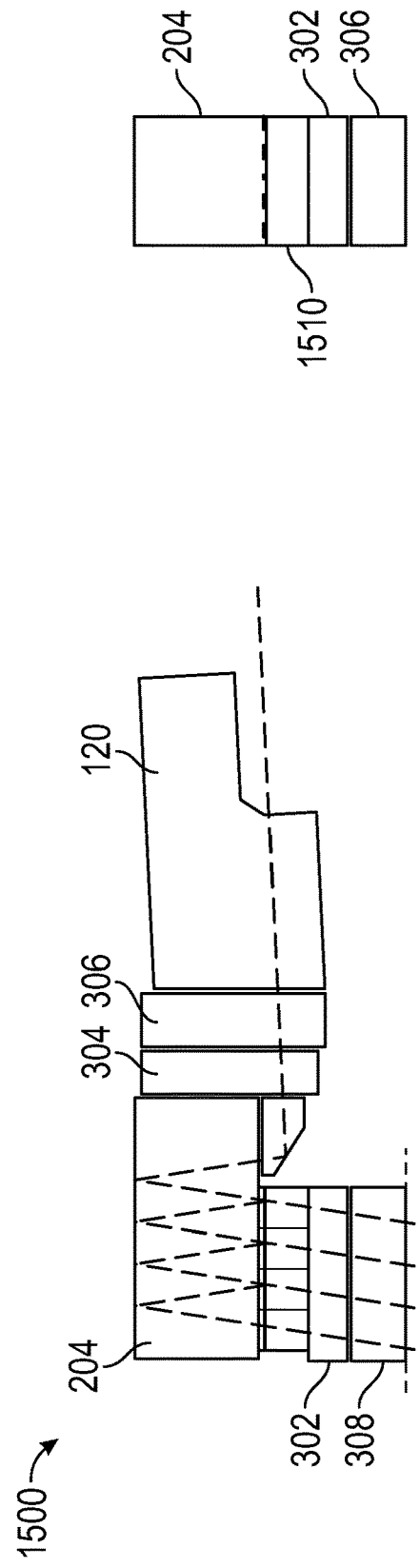
FIG. 15 illustrates an example MDM having filters fabricated with cuts in a glass, in accordance with certain aspects of the present disclosure.
Figure 15:
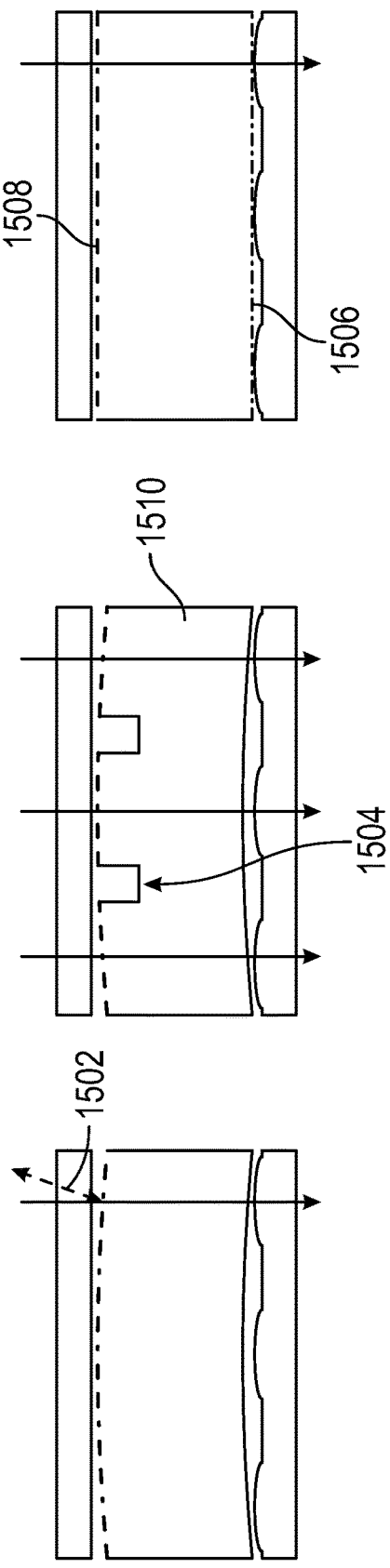

FIG. 15 illustrates an MDM 1500 having filters 1510 fabricated with cuts in a glass, in accordance with certain aspects of the present disclosure. Thin film filter coatings may include a layer stack of different materials that are deposited on the filter glass at high temperatures. The optical coatings induce mechanical stress in the filters at the operating temperature of transceiver modules due to different thermal expansion coefficients. This results in the warping of optical filters. When beams hit the warped filter coatings, a beam angle error (represented by arrow 1502) is inflicted on the reflected beams, as shown. This beam angle error can stack through the multiple reflections on warped coatings. Once focused toward the optical interface to the photonic chip, the beam angle error translates to a position error of the focused beam, causing excess coupling losses. Certain aspects provide various mitigation strategies to reduce beam angle errors.

Certain aspects are directed towards segmenting the filter coating into separated fields (e.g., regions). The fields can be separated by cutting through the filter coatings and a partial thickness of the filter glass after the deposition of the coatings, as shown. Alternatively, a trench 1504 may be formed, and the filter coating may be applied after the trench is formed. With multiple fields, as shown, each beam hits the center of a respective field with a horizontal surface, as shown. Thus, reflected beams incur a reduced beam angle error.

Some aspects are directed towards applying a coating 1506 (e.g., labeled transparent dummy coating in FIG. 15) to the filter glass on the bottom side (e.g., using the same materials used for the filter coating 1508 on the top side). The coating 1506 may be in a layer stack that is optically transparent in the transmission region of the filter coating. By having coatings on both sides of the filter glass, mechanical stress can be balanced, and warpage reduced.

Certain aspects provide an optical assembly comprising a fiber array, a lens array, and optical filters, where optical signals are routed between an optical interface of optical fibers and an optical interface connected to an integrated photonic circuit chip. The optical filters may be segmented by partial cuts into individual fields (e.g., forming trench 1504), where each field transports a single optical signal. Some aspects provide an optical assembly comprising a fiber array, a lens array, and optical filters, where optical signals are routed between an optical interface of optical fibers and an optical interface connected to an integrated photonic circuit chip. The optical filters may have optical coatings on more than one surface (e.g., top and bottom surfaces).

Figure 16:
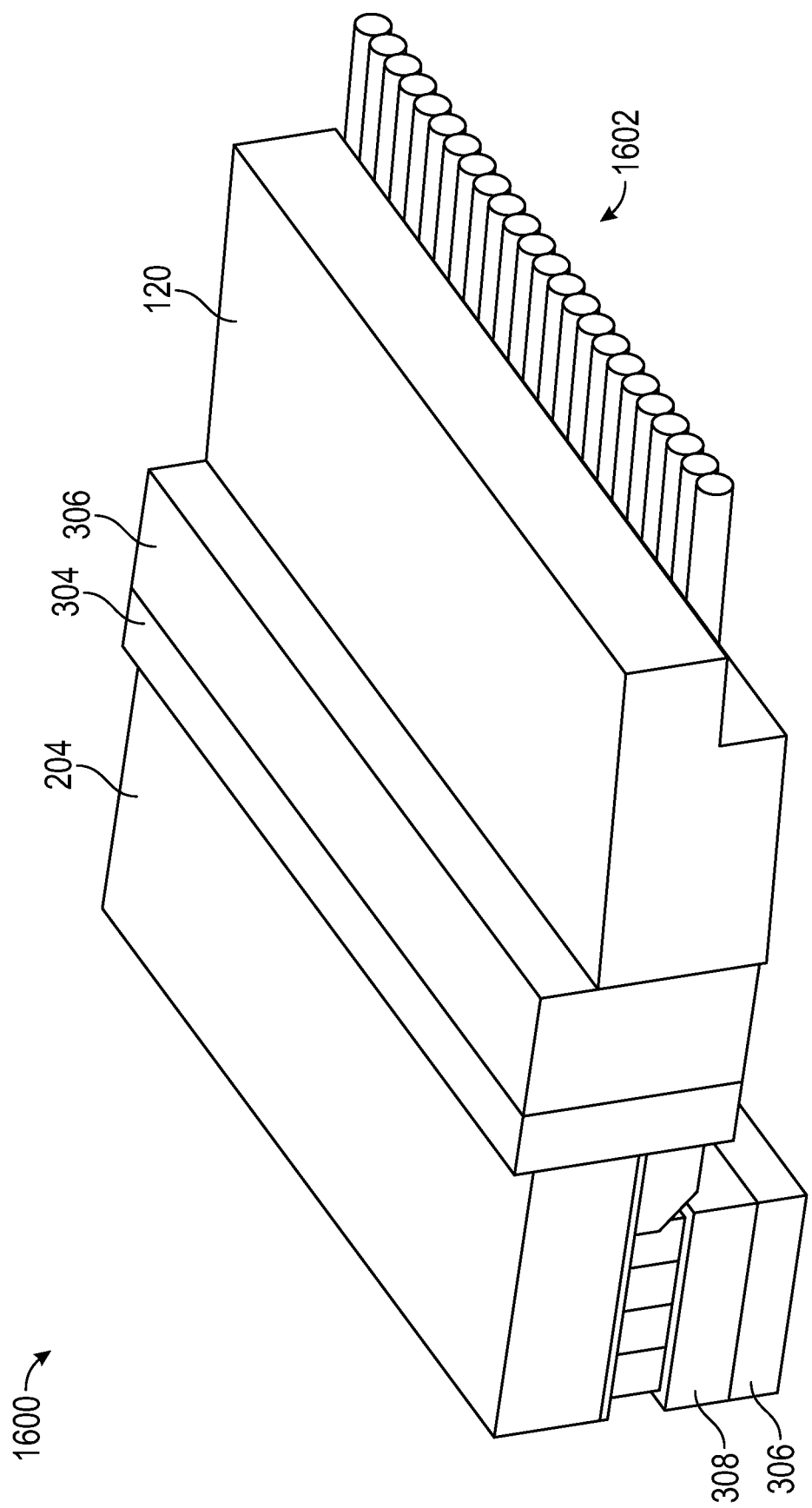
FIG. 16 illustrates an example MDM with a high quantity of fibers, in accordance with certain aspects of the present disclosure.

FIG. 16 illustrates an MDM 1600 with a high quantity of fibers 1602, in accordance with certain aspects of the present disclosure. To increase data rates, the number of fibers in the MDM may be increased, thus interfacing an increased number of optical signals at the same time, as shown. Certain aspects provide an optical assembly comprising a fiber array, a lens array, and optical filters, where optical signals are routed between an optical interface of optical fibers and an optical interface connected to an integrated photonic circuit chip. The fiber array may include more than two optical fibers, as shown.

Figure 17:
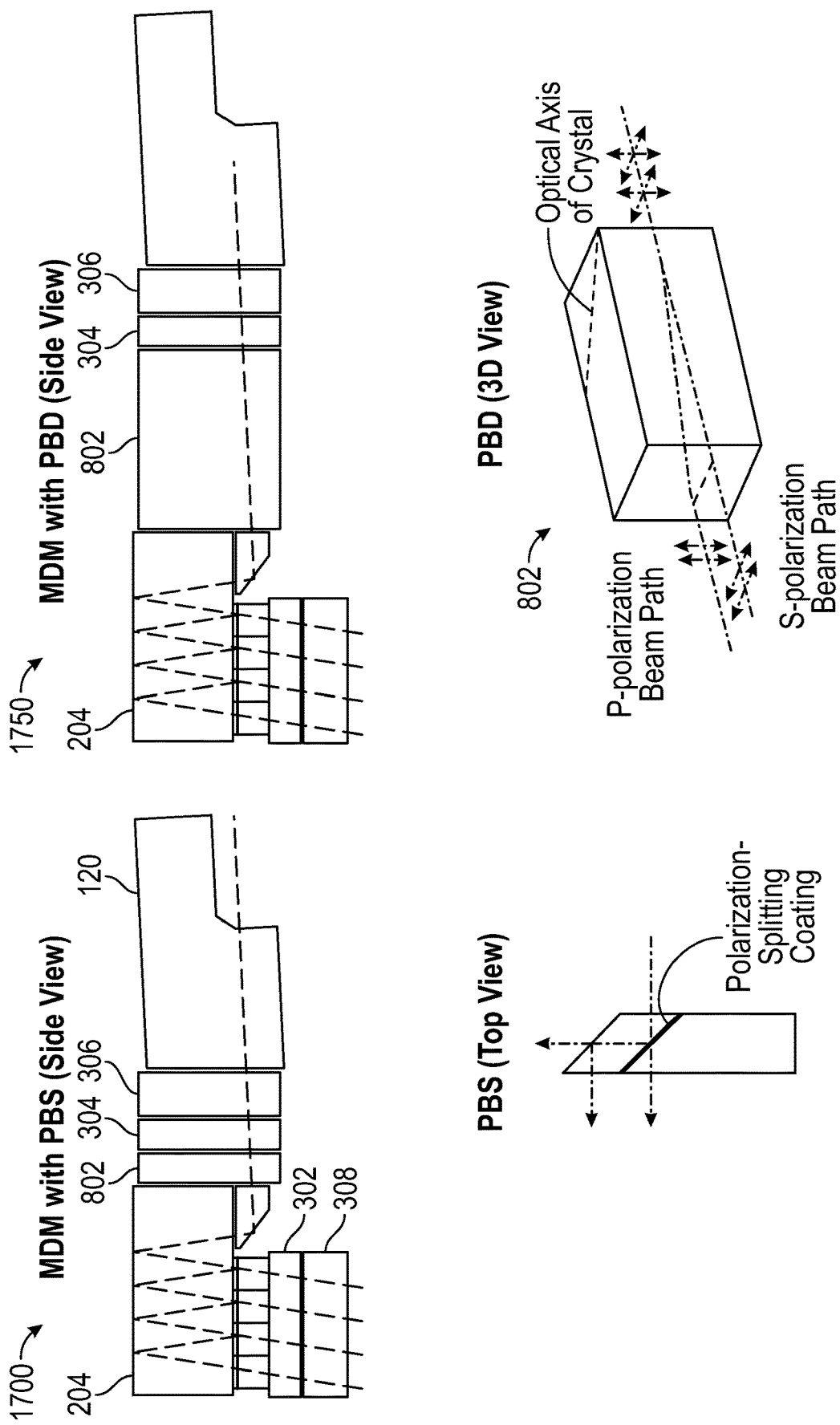
FIG. 17 illustrates an example MDM implemented with a PBS and an MDM implemented with a polarization beam displacer (PBD), in accordance with certain aspects of the present disclosure.

FIG. 17 illustrates an MDM 1700 implemented with a PBS and an MDM 1750 implemented with a polarization beam displacer (PBD), in accordance with certain aspects of the present disclosure. A PBD can be employed for splitting optical signals by the polarization state. PBDs use birefringent crystals to offset signals of one polarization. Although PBDs are generally larger than PBSs, their advantage is that they can offset multiple beams at the same time, independent of the point of incidence of the beams. This makes PBDs more compatible with MDM designs for a higher number of fibers. Certain aspects provide an optical assembly comprising a fiber array, lens array, optical filters, and a birefringent crystal where optical signals are routed between an optical interface of optical fibers and an optical interface connects to an integrated photonic circuit chip. The birefringent crystal separates optical signals based on their polarization states.

Figure 18:
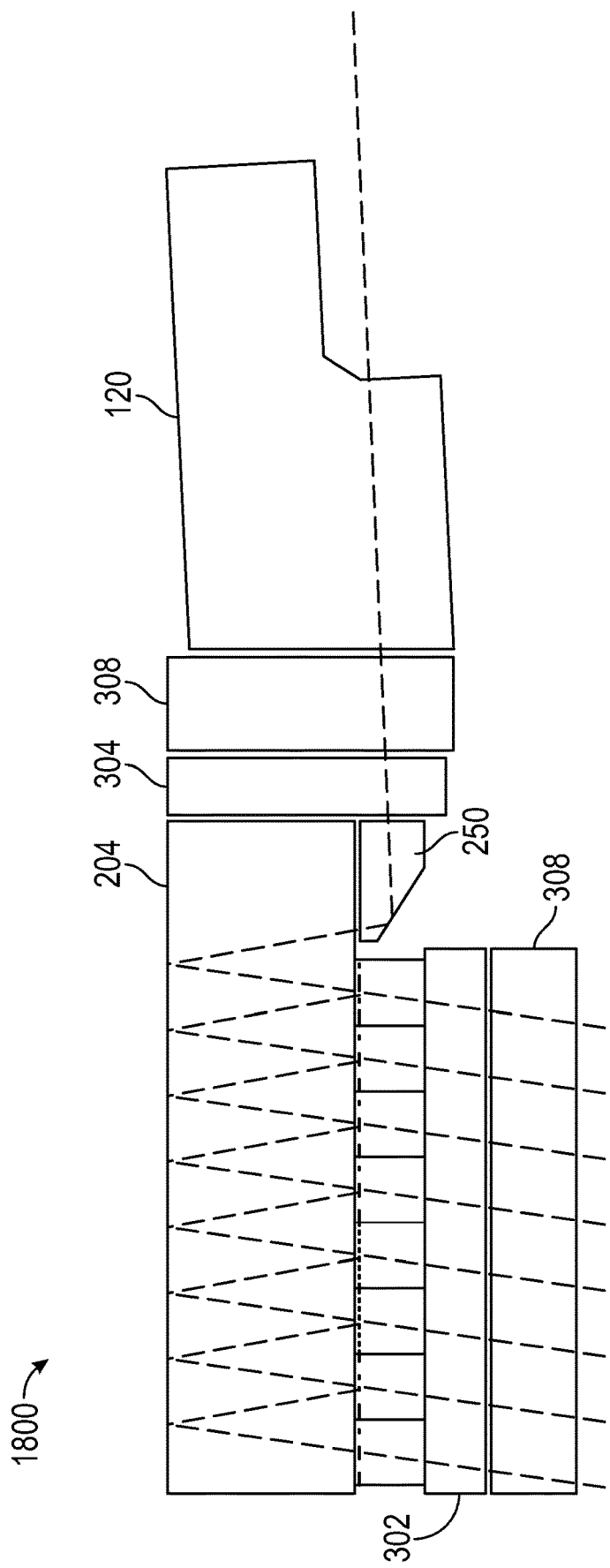
FIG. 18 illustrates an 8-channel MDM, in accordance with certain aspects of the present disclosure.

FIG. 18 illustrates an 8-channel MDM 1800, in accordance with certain aspects of the present disclosure. Course wavelength-division multiplexing 4 (CWDM4) is a widely adopted optical telecommunication standard. However, the data rate of CWDM4 is limited by the available number of channels. A greater number of channels may help to further increase the data rate. Thus, the aspects described herein may be implemented with any number of channels, such as eight channels as shown in FIG. 18. Certain aspects of the present disclosure provide an optical assembly comprising a fiber array, a lens array, and optical filters. Optical signals may be routed between an interface of optical fibers and an interface connecting to an integrated photonic circuit chip.

Figure 19:
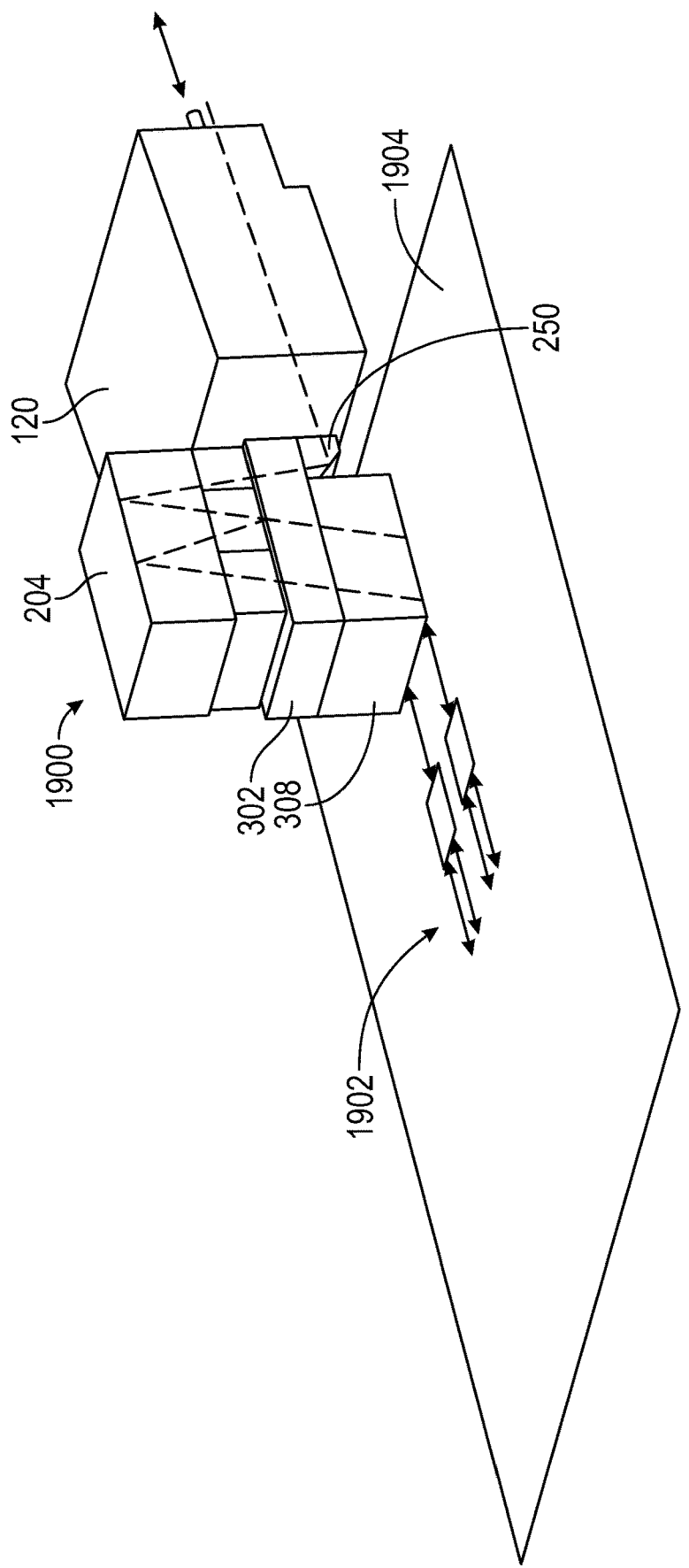
FIG. 19 illustrates an optical system with external and on-chip MDMs, in accordance with certain aspects of the present disclosure.

FIG. 19 illustrates an optical system with external and on-chip MDMs, in accordance with certain aspects of the present disclosure. MDMs external to the photonic chip may be combined with on-chip MDMs. For instance, optical signals at the external MDM fiber interface may include four different wavelengths. The external MDM 1900 splits optical signals into two wavelength pairs. Both pairs are coupled to the photonic chip 1904, where on-chip MDMs 1902 split the wavelength pairs into single-wavelength optical signals. For such a configuration, a simplified external MDM design may be used, while leveraging better integration in the photonic chip platform, reducing overall cost and complexity.

Certain aspects provide an optical system comprising an integrated photonic circuit chip and an external optical assembly, where the external optical assembly routes optical signals of a multitude of wavelengths through an interface of optical fibers. The external optical assembly separates optical signals into sub-multitudes of wavelengths and interfaces the separated optical signals with the integrated photonic circuit chip. The integrated photonic circuit chip may include elements that split the sub-multitudes of wavelengths into optical signals of single wavelengths.

Figure 20:
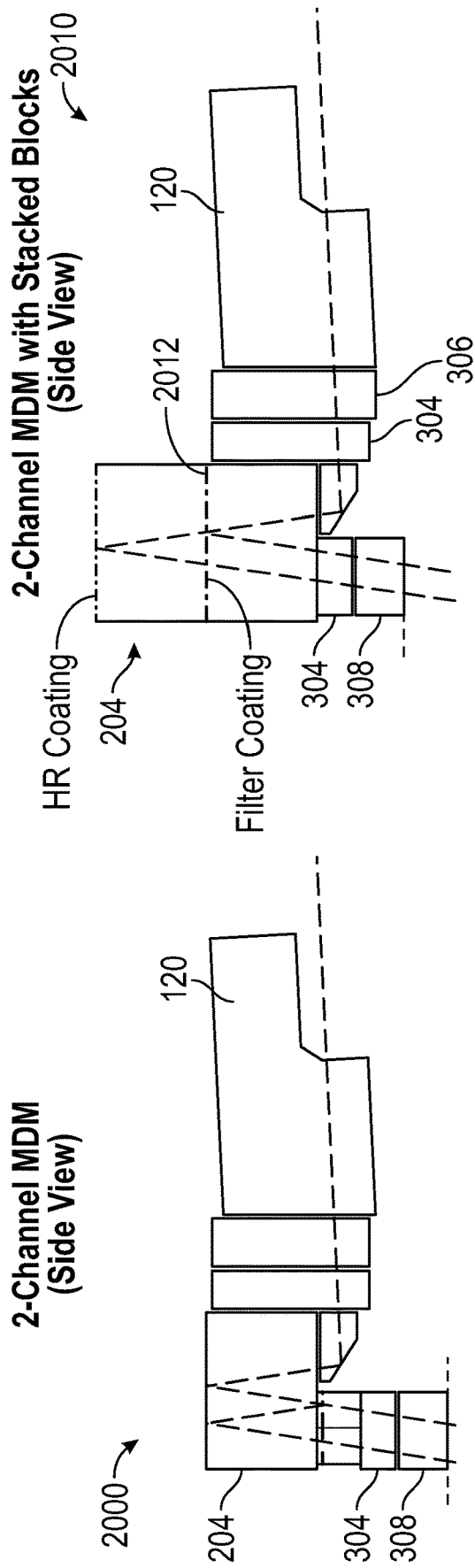
FIG. 20 illustrates 2-channel MDMs, in accordance with certain aspects of the present disclosure.
Figure 20:
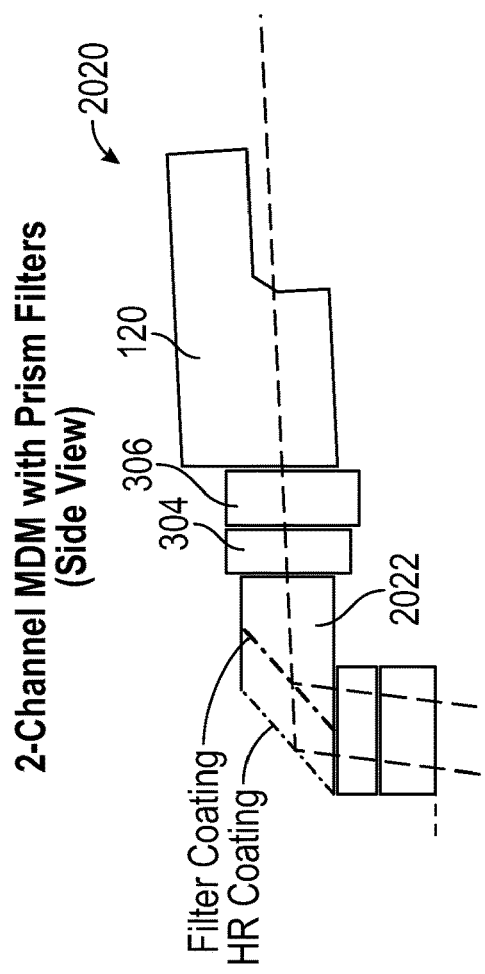

FIG. 20 illustrates 2-channel MDMs 2000, 2010, 2020, in accordance with certain aspects of the present disclosure. The MDM 2000 is a down-scaled version of the 4-channel MDMs describes herein. In other words, the MDM 2000 is implemented with two channels using two optical filters, as shown. The MDM 2010 provides simplified MDM manufacturing by including a single optical filter coating 2012 and larger, easier to assemble parts. The MDM 2020 has the shortest beam paths (e.g., as compared to MDMs 2000, 2010), and thus the potentially lowest loss, but includes a coated prism filter 2022. The aspects described herein may be implemented with polarization splitting capability by integrating polarization beam splitters, polarization beam displacers, or focal polarization beam displacers.

Certain aspects provide an optical assembly comprising a fiber array, a lens array, optical spacers, and a prism, where a first optical spacer is coated with a wavelength-selective coating, and a second optical spacer is coated with a high-reflectivity coating, as shown in FIG. 20. The second optical spacer may be disposed on top of the first optical spacer. Certain aspects provide an optical assembly comprising a fiber array, a lens array, an optical spacer, and a prism, where the prism is coated with a wavelength-selective coating, and where the optical spacer is coated with a high-reflectivity coating.

Figure 21:
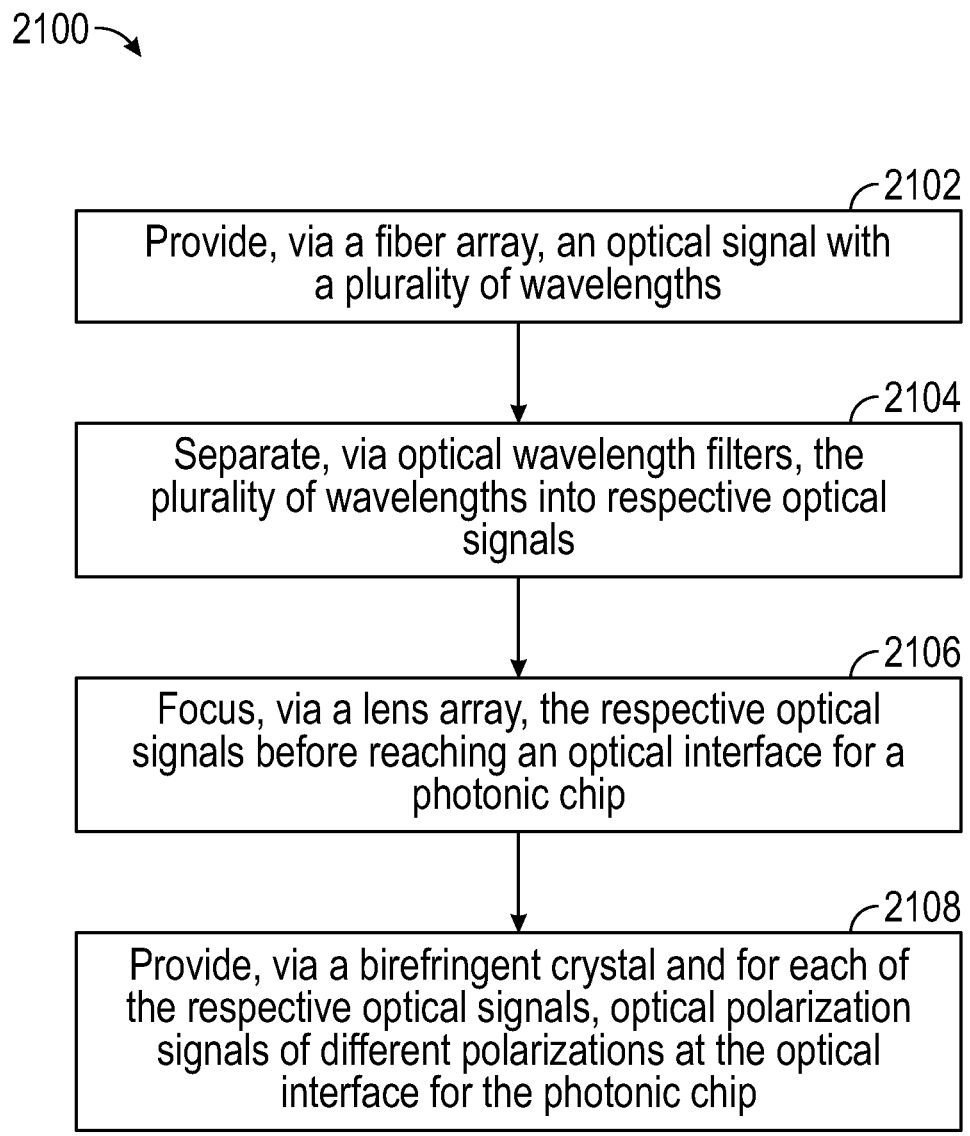
FIG. 21 is a flow diagram illustrating example operations for optical signal processing, in accordance with certain embodiments of the present disclosure.

FIG. 21 is a flow diagram illustrating example operations 2100 for optical signal processing, in accordance with certain embodiments of the present disclosure. The operations 2100 may be performed, for example, by an optical assembly, such as an MDM (e.g., MDM 200 of FIG. 2).

At block 2102, the optical assembly provides, via a fiber array (e.g., fiber array 120), an optical signal (e.g., optical signal 104) with a plurality of wavelengths. At block 2104, the optical assembly separates, via optical wavelength filters (e.g., optical filters 21, 216, 218, 220), the plurality of wavelengths into respective optical signals (e.g., optical signals 232, 234, 236, 238).

At block 2106, the optical assembly focuses, via a lens array (e.g., lens array 208), the respective optical signals before reaching an optical interface (e.g., optical interface 290) for a photonic chip. At block 2108, the optical assembly provides, via a birefringent crystal (e.g., birefringent crystal 210) and for each of the respective optical signals, optical polarization signals of different polarizations at the optical interface for a photonic chip.

In some aspects, the optical assembly also reflects, via a prism (e.g., prism 250), the optical signal from the fiber array towards an optical block (e.g., optical block 204), and reflects, via the optical block, the optical signal to each of the optical wavelength filters. The optical wavelength filters may be disposed between the optical block and the lens array. In some aspects, an offset (e.g., offset 280) between the optical polarization signals of different polarizations at the optical interface is smaller than spacing (e.g., spacing 282) of lenses in the lens array.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

I claim:

1. An optical assembly, comprising:
a fiber array configured to provide an optical signal with a plurality of wavelengths;
optical wavelength filters configured to separate the plurality of wavelengths into respective optical signals;
a lens array configured to receive the respective optical signals from the optical wavelength filters and focus the respective optical signals before reaching an optical interface for a photonic chip; and
a birefringent crystal disposed between the lens array and the optical interface.

2. The optical assembly of claim 1, where the optical wavelength filters have a warped surface.

3. The optical assembly of claim 1, where the birefringent crystal is disposed between two elements in the optical assembly that are of a same material.

4. The optical assembly of claim 3, wherein the two elements include the lens array and a spacer.

5. The optical assembly of claim 1, further comprising a silicon spacer between the birefringent crystal and the optical interface.

6. The optical assembly of claim 1, where a prism is disposed between the birefringent crystal and the fiber array.

7. The optical assembly of claim 6, wherein the prism is configured to reflect the optical signal towards an optical block disposed above the optical wavelength filters.

8. The optical assembly of claim 1, wherein the birefringent crystal is configured to provide, for each of the respective optical signals, optical polarization signals of different polarizations at the optical interface, wherein an offset between the optical polarization signals of different polarizations at the optical interface is smaller than spacing of lenses in the lens array.

9. The optical assembly of claim 8, wherein the optical polarization signals of different polarizations have a 90° polarization offset.

10. An optical assembly, comprising:
a lens array having a first portion and a second portion;
an optical block;
optical wavelength filters disposed between the optical block and the first portion of the lens array;
a spacer disposed between the second portion of the lens array and the optical block; and
a birefringent crystal disposed between the first portion of the lens array and an optical interface for a photonic chip.

11. The optical assembly of claim 10, further comprising a prism disposed between the second portion of the lens array and the optical interface.

12. The optical assembly of claim 10, where the optical wavelength filters have a warped surface.

13. The optical assembly of claim 10, where the birefringent crystal is disposed between two elements in the optical assembly that are of a same material.

14. The optical assembly of claim 13, wherein the two elements include the lens array and another spacer.

15. The optical assembly of claim 10, further comprising a silicon spacer between the birefringent crystal and the optical interface.

16. The optical assembly of claim 10, wherein the birefringent crystal is configured to:
receive optical signals; and
provide, for each of the optical signals, optical polarization signals of different polarizations at the optical interface, wherein an offset between the optical polarization signals of different polarizations at the optical interface is smaller than spacing of lenses in the lens array.

17. The optical assembly of claim 16, wherein the optical polarization signals of different polarizations have a 90° polarization offset.

18. A method for optical signal processing, comprising:
providing, via a fiber array, an optical signal with a plurality of wavelengths;
separating, via optical wavelength filters, the plurality of wavelengths into respective optical signals;

focusing, via a lens array, the respective optical signals before reaching an optical interface for a photonic chip; and providing, via a birefringent crystal and for each of the respective optical signals, optical polarization signals of different polarizations at the optical interface for the photonic chip.

19. The method of claim 18, further comprising:

reflecting, via a prism, the optical signal from the fiber array towards an optical block; and reflecting, via the optical block, the optical signal to each of the optical wavelength filters, wherein the optical wavelength filters are disposed between the optical block and the lens array.

20. The method of claim 18, wherein an offset between the optical polarization signals of different polarizations at the optical interface is smaller than spacing of lenses in the lens array.

\* \* \* \* \*